(12) United States Patent
Kakwani

(10) Patent No.: US 11,593,376 B2
(45) Date of Patent: Feb. 28, 2023

(54) METHOD, APPARATUS, AND COMPUTER-READABLE MEDIUM TO EXTRACT A REFERENTIALLY INTACT SUBSET FROM A DATABASE

(71) Applicant: Informatica LLC, Redwood City, CA (US)

(72) Inventor: Chitresh Kakwani, Bengaluru (IN)

(73) Assignee: INFORMATICA LLC, Redwood City, CA (US)

( * ) Notice: Subject to any disclaimer, the term of this patent is extended or adjusted under 35 U.S.C. 154(b) by 1233 days.

(21) Appl. No.: 15/288,023

(22) Filed: Oct. 7, 2016

(65) Prior Publication Data

US 2017/0103107 A1 Apr. 13, 2017

Related U.S. Application Data

(60) Provisional application No. 62/239,712, filed on Oct. 9, 2015.

(51) Int. Cl.
*G06F 16/2455* (2019.01)
*G06F 16/28* (2019.01)

(52) U.S. Cl.
CPC ...... *G06F 16/24553* (2019.01); *G06F 16/288* (2019.01)

(58) Field of Classification Search
CPC ......... G06F 17/30483; G06F 17/30604; G06F 17/306; G06F 16/24553; G06F 16/288
See application file for complete search history.

(56) References Cited

U.S. PATENT DOCUMENTS

| | | | | |
|---|---|---|---|---|
| 5,671,419 | A * | 9/1997 | Carini | G06F 8/433 717/145 |
| 6,356,902 | B1 * | 3/2002 | Tan | G06F 16/40 709/239 |
| 6,460,043 | B1 * | 10/2002 | Tabbara | G06F 16/2452 |
| 6,560,043 | B1 * | 5/2003 | Saito | G02B 9/12 359/740 |
| 2003/0023388 | A1 * | 1/2003 | Wagner | G16B 5/00 702/20 |
| 2004/0015470 | A1 * | 1/2004 | Smith | G06F 17/30867 |
| 2005/0269231 | A1 * | 12/2005 | White | A61B 50/30 206/438 |

(Continued)

*Primary Examiner* — Amresh Singh
*Assistant Examiner* — Fernando M Mari Valcarcel
(74) *Attorney, Agent, or Firm* — Amardeep S. Grewal; Reed Smith LLP

(57) ABSTRACT

An apparatus, computer-readable medium, and computer-implemented method for data subsetting, including receiving a request comprising a criterion indicating a criterion table in a plurality of tables of a database, as schema of the database corresponding to an entity graph, the entity graph comprising a plurality of entities corresponding to the plurality of tables and a plurality of directed edges connecting the plurality of entities, determining directed edges in the plurality of directed edges that must be traversed in both directions in order to traverse all entities in the entity graph starting from a criterion entity corresponding to the criterion table, generating, an ordered list of edges for the entity graph based on the directed edges that must be traversed in both directions and topological ordering, and generating a subset of data from the plurality of tables based on the ordered list of edges for the entity graph and the request.

39 Claims, 25 Drawing Sheets

(56) References Cited

U.S. PATENT DOCUMENTS

| | | | |
|---|---|---|---|
| 2009/0097418 A1* | 4/2009 | Castillo | H04L 41/12 |
| | | | 370/255 |
| 2010/0189113 A1* | 7/2010 | Csaszar | H04L 45/00 |
| | | | 370/400 |
| 2014/0143110 A1* | 5/2014 | Qin | G06Q 40/04 |
| | | | 705/37 |
| 2014/0172850 A1* | 6/2014 | Borkar | G06F 17/30587 |
| | | | 707/736 |
| 2015/0103671 A1* | 4/2015 | Ernstrom | H04L 41/0659 |
| | | | 370/238 |
| 2015/0112818 A1* | 4/2015 | Lombriser | G06Q 30/0277 |
| | | | 705/14.73 |
| 2015/0120432 A1* | 4/2015 | Wang | G06Q 30/0242 |
| | | | 705/14.41 |
| 2015/0269231 A1* | 9/2015 | Huynh | G06F 16/951 |
| | | | 707/722 |

\* cited by examiner

Iteratively traverse, in a parent to child direction, any directed edges in the one or more directed edges that must be traversed in both directions which have not already been traversed in a parent to child direction and which have a parent entity in the list of discovered entities, the list of discovered entities being updated after each traversed edge to add each child entity of the traversed edge to the list of discovered entities

1601

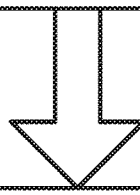

Add the traversed directed edges to the ordered list of edges in the order of traversal

Iteratively traverse, in a child to parent direction, any directed edges which have a child entity in the list of discovered entities, the list of discovered entities being updated after each traversed edge to add each parent entity of the traversed edge to the list of discovered entities; and

1603

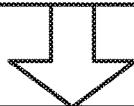

Add any traversed directed edges which are not already in the ordered list of edges to the ordered list of edges based at least in part on a topological ordering of the entities in the list of discovered entities

1604

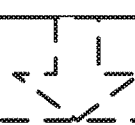

Determine whether an entity in the list of discovered entities is a combined entity corresponding to a cyclical sequence of entities in the plurality of entities which are connected by a cyclical sequence of one or more directed edges

1605

Add the cyclical sequence of one or more directed edges to the ordered list of edges for the entity graph along with a loop indicator, the cyclical sequence of one or more directed edges being added to the ordered list of edges based at least in part on a topological ordering of the entities in the list of discovered entities

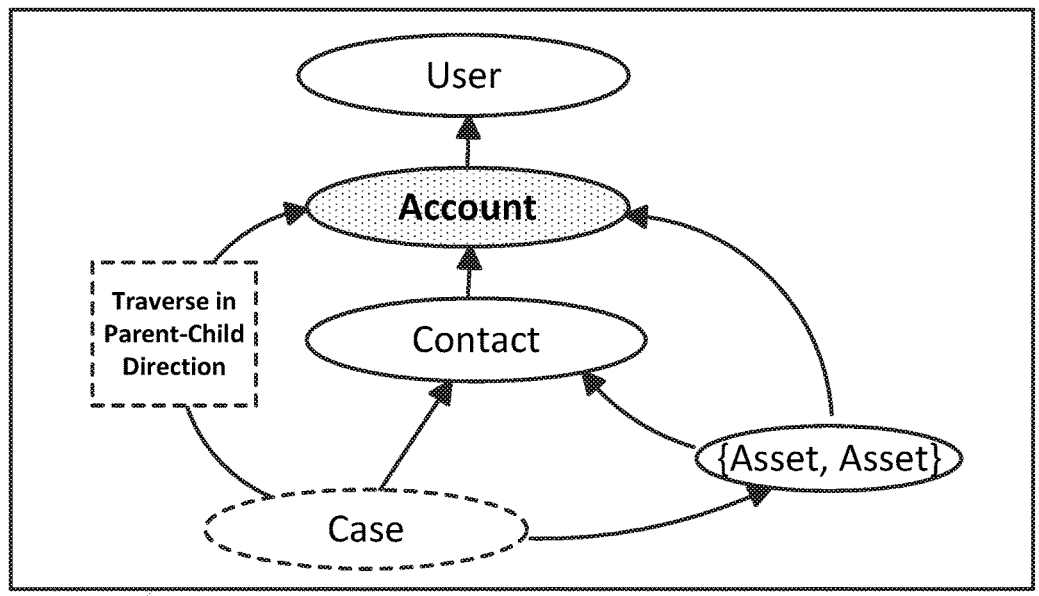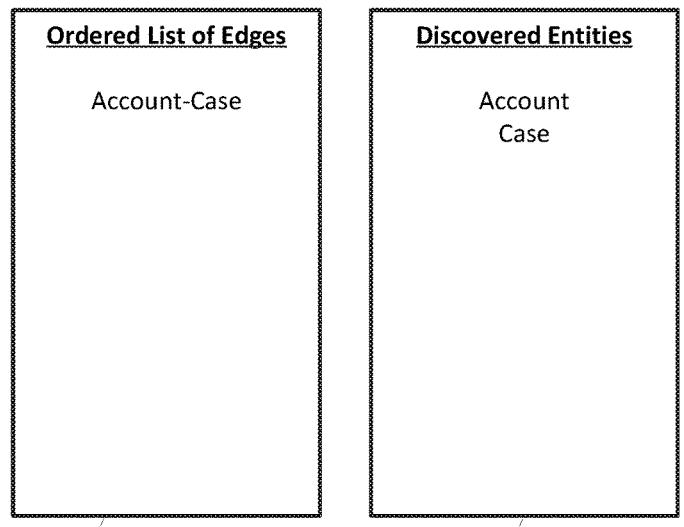
Fig. 17A

METHOD, APPARATUS, AND COMPUTER-READABLE MEDIUM TO EXTRACT A REFERENTIALLY INTACT SUBSET FROM A DATABASE

RELATED APPLICATION DATA

This application claims priority to U.S. Provisional Application No. 62/239,712, filed Oct. 9, 2015, the disclosure of which is hereby incorporated by reference in its entirety.

BACKGROUND

Enterprises frequently store large volumes of data across multiple tables in production databases, as well as in data warehouses. In order to effectively perform processes such as data testing, data analysis, and data reporting, it is sometimes necessary to extract information datasets from multiple tables at once.

For example, FIG. 1 shows a customer database that includes two tables, 101 and 102. The first table 101 lists the customer names and zip codes and the second table 102 lists IDs, customer names, and states. The Name field in the second table 102 may be a foreign key which points to the primary key of the Name field in the first table 101. In this case, if a user wishes to extract a subset of data for certain IDs, customer names, and corresponding states from table 102, then it will also be necessary to extract the corresponding zip code data from table 101 to ensure referential integrity. So, for example, if a user wanted to extract a data subset corresponding to the state value for the customer ID corresponding to ID=1, the data subset would include the values Robert and New York, as well as the value 11357.

FIG. 1 illustrates a simple example, but when there are many data dependencies between multiple tables, determining the appropriate subset of data to compile from all of the appropriate tables can be a complex and resource-intensive task.

Subset extraction from production databases is required when creating sandboxes or populating test environments which need data that mirrors the production data. Relational databases and many services such as Salesforce store data in multiple objects/tables which have relationships with other objects/tables. These relationships give rise to complex schemas which can be modeled as a graph where objects are vertices and relationships are edges.

When extracting a subset from these databases, it is often desirable that the referential integrity within the subset is maintained so as to mirror relationships present in the production data. A subset is obtained by starting with a set of filtered records in one of the objects and selecting records by performing join operations with related objects as the graph is traversed. There are a number of ways to traverse the schema graph. Prior traversal schemes may lead to the problem of no selection in some objects (when an intersection operation is used); some others may end up selecting a bigger subset than required (when a union operation is used).

There are other schemes, such as the one described in U.S. Non-Provisional application Ser. No. 14/389,360 filed Dec. 13, 2012, the disclosure of which is hereby incorporated by reference in its entirety (hereinafter "the '360 application"). The '360 application includes the concept of Major/Minor relationships wherein an additional condition is added to the subset problem: for each record that gets selected, all the records referring to that record should also be selected. While this method works well for simple schema, it ends up selecting a large subset in some cases in complex schemas where one object is related to another through multiple relationships, directly or indirectly, and is not scalable for large schemas as it requires a lot of joins.

BRIEF DESCRIPTION OF THE DRAWINGS

FIG. 16A illustrates the first phase of each iteration in the process for traversing the entity graph over one or more iterations and adding traversed edges to the ordered list of edges for the entity graph.

FIG. 16B illustrates the second phase of each iteration in the process for traversing the entity graph over one or more iterations and adding traversed edges to the ordered list of edges for the entity graph.

FIGS. 17A-17B illustrate the generation of an ordered list of edges for the entity graph in FIG. 14 according to an exemplary embodiment.

DETAILED DESCRIPTION

While methods, apparatuses, and computer-readable media are described herein by way of examples and embodiments, those skilled in the art recognize that methods, apparatuses, and computer-readable media for extracting a subset of data from a database are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Applicant has discovered a method, apparatus, and computer-readable medium for extracting a referentially intact data subset with a minimum number of parent to child joins while avoiding the problems of large subsets and no selection in objects. This is an improvement over the previous methods in that it by reducing the number of parent to child joins to a minimum, this method reduces the number of joins required to satisfy referential integrity and thus reduces the overall number of joins required to compute the subset.

Unlike the '360 application, the present method, apparatus, and computer-readable medium does not require completeness of data sets (completeness meaning that for each record that gets selected, all the records referring to that record and all the records referred by that record should also be selected) while still maintaining referential integrity (referential integrity meaning that for each record that gets selected, all the records referred by that record should also be selected). As discussed in the background, the completeness requirement may lead to large subsets which are not suitable for certain environments which have storage limitations (such as Salesforce sandboxes).

Figure 1:
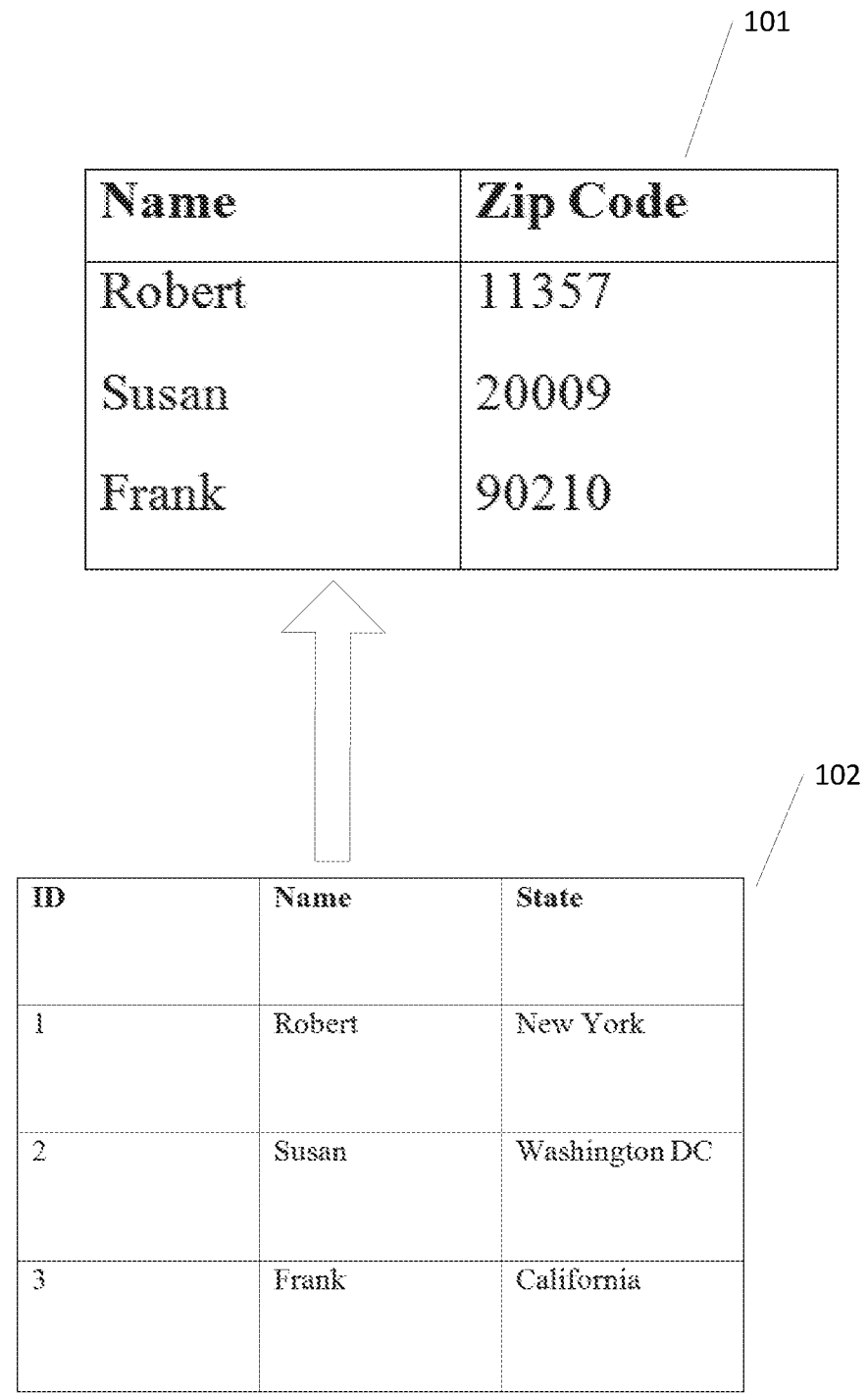
FIG. 1 illustrates an example of two data tables that can have a data dependency between them.
Figure 2:
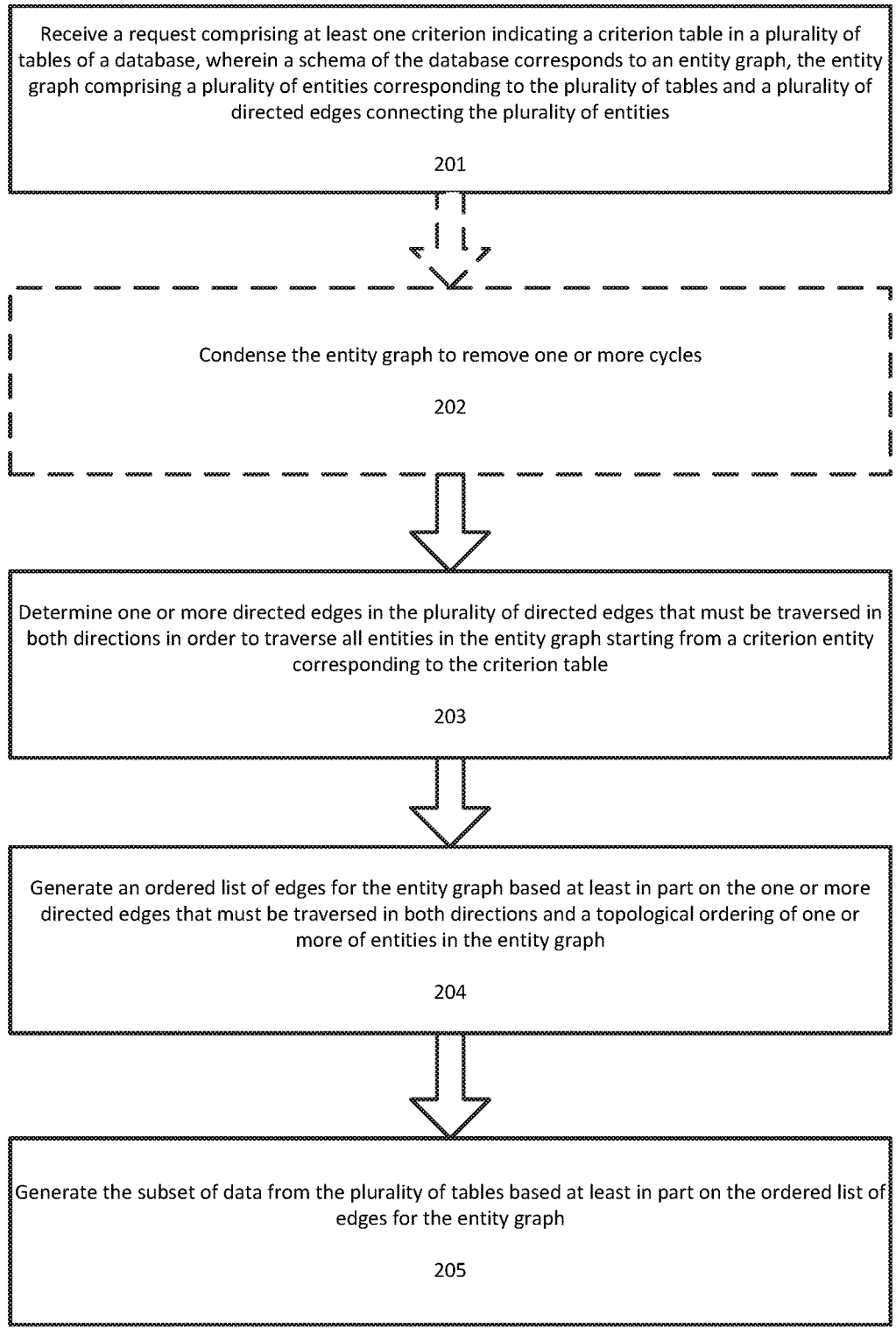
FIG. 2 illustrates a flowchart for extracting a subset of data from a database according to an exemplary embodiment.

FIG. 2 illustrates a flowchart for extracting a subset of data from a database according to an exemplary embodiment. At step 201 a request comprising at least one criterion indicating a criterion table in a plurality of tables of a database is received. The request can be received from a user of the database and the criteria or criterion can correspond to a filter on one or more of the objects in the database, such as a table and table column. The table which is the subject of the criterion/criteria is referred to as the criterion table.

For example, if there is a "Name" column in a "Contact" table of the database, the request can be:
SELECT*FROM Contact
WHERE Name='John Smith';

In this case, the criterion table is the Contact table and the criterion is where the value in the Name column in the Contact table is equal to "John Smith." The present application extracts a referentially intact subset of data from the tables of the database based on the request and the criterion. A referentially intact subset is one in which referential integrity is maintained. This means that if a record that references another record is selected in the subset, then the referenced record also gets selected in the subset.

Figure 3A:
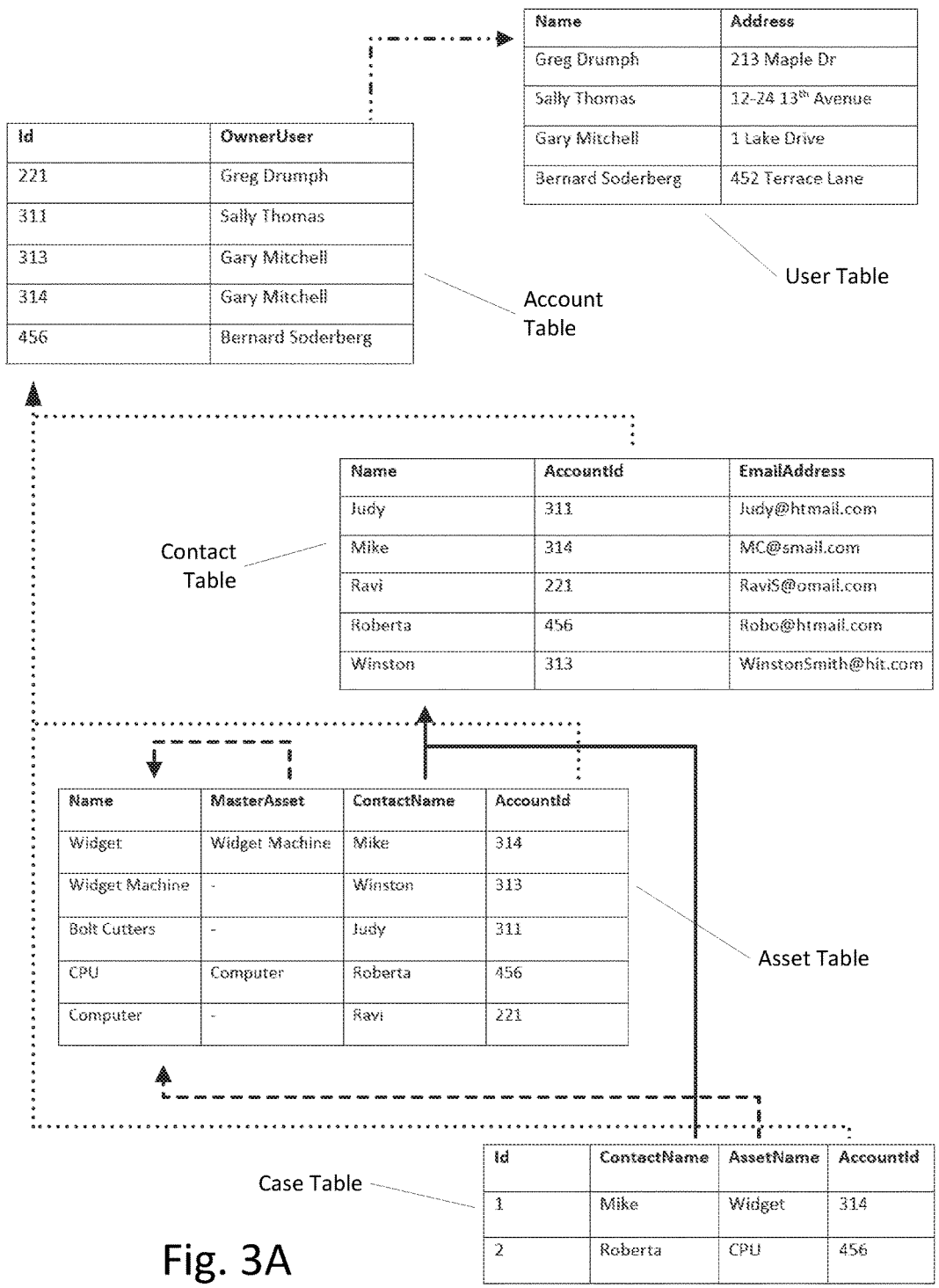
FIGS. 3A-3B illustrate an example database and a request according to an exemplary embodiment.

FIG. 3A illustrates an example database including a Case table, an Asset table, a Contact table, an Account table, and a User table. As shown in FIG. 3A, there are several relationships between the tables. A relationship is defined from a child table to a parent table when the child table contains a foreign key that references the primary key of the parent table. The arrows in FIG. 3A illustrate several child-parent relationships. For example, the dotted arrows indicate child-parent relationships from the Asset table to the Account table, the Case table to the Account table, and the Contact table to the Account table. This is because the AccountId column in each of the child tables is a foreign key which references the Id column of the Account table which is the primary key in the Account table.

Similarly, the dashed arrows indicate child-parent relationships where the Asset table is the parent. In this case, there is child-parent relationship from the Asset table to itself, since the "MasterAsset" foreign key in the Asset table points to the "Name" primary key in the Asset table. Additionally, the dashed and dotted line indicates a child-parent relationship between the Account table and the User table.

Figure 3B:
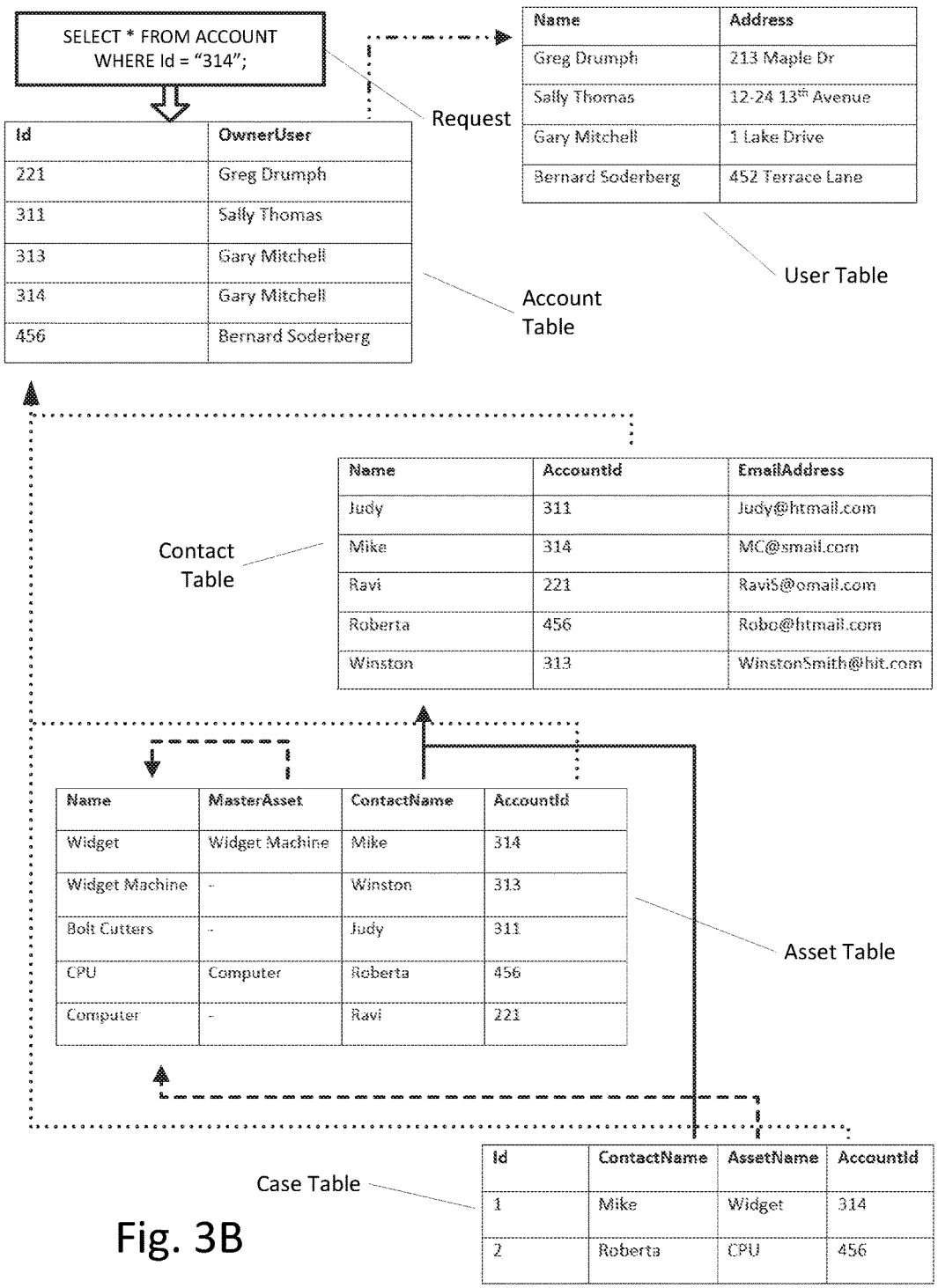

FIG. 3B illustrates the database of FIG. 3A along with a request which specifies a criterion table (the Account table) and a criterion (WHERE Id="314"). We see from FIG. 3B that this request results in the selection of the record with Id=314 and OwnerUser="Gary Mitchell" from the Account table. In order to extract a referentially intact subset of data from the database based on this criterion, it is therefore necessary to extract all records referred to by this record. In this case, the only record referred to by this record would be in the User table ("Gary Mitchell, 1 Lake Drive").

While traversing an edge from the parent-to-child direction is not required for maintaining referential integrity, it may be required to ensure that a subset is obtained for all objects in the schema. For example, if the only records selected for a subset based on the request in FIG. 3B were in the Account table and the User table, then the subset would not include any records for the Asset object, the Case object, or the Contact object. However, traversing an edge from parent-to-child can lead to additional child record selection and has the added cost of joins. It is therefore desirable to minimize the number of edges that should be traversed in both directions (child-to-parent and parent-to-child) to span the entire graph.

Returning to FIG. 2, as indicated in step 201, the schema of the database corresponds to an entity graph comprising a plurality of entities corresponding to the plurality of tables and a plurality of directed edges connecting the plurality of entities.

Figure 4:
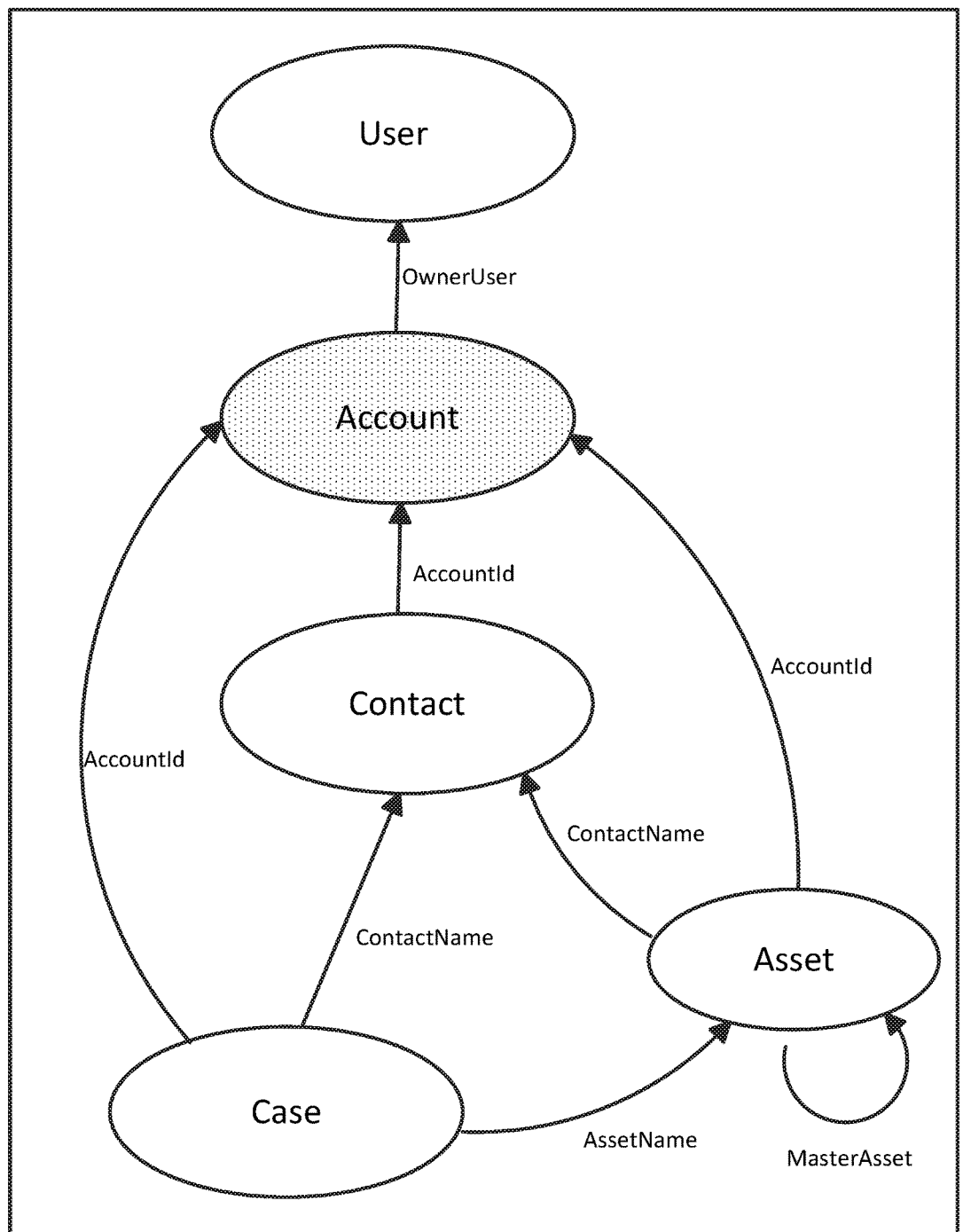
FIG. 4 illustrates an entity graph corresponding to the schema of the database shown in FIGS. 3A-3B according to an exemplary embodiment.

FIG. 4 illustrates an entity graph 400 corresponding to the schema of the database shown in FIGS. 3A-3B. As shown in FIG. 4, the entity graph 400 includes a plurality of entities corresponding to the tables shown in FIGS. 3A-3B. The plurality of entities include a shaded criterion entity, the Account entity, corresponding to the criterion table in the request 306 of FIG. 3B. The entity graph 400 also includes a plurality of directed edges connecting the plurality of entities. Each directed edge in the plurality of directed edges runs from a child entity corresponding to a table in the plurality of tables to a parent entity corresponding to a table in the plurality of tables. For example, the edge Asset-Account runs from the Asset entity to the Account entity and indicates a child-parent relationship between the Asset table and the Account table. Additionally, each of the directed edges indicates the foreign key in the child table which is used to reference the primary key of the parent table. For example, the directed edge between the Account entity and the User entity is labeled "OwnerUser" since the "OwnerUser" column of the Account table is the foreign key which points to the primary key of the User table.

The entity graph corresponding to a schema of the database for which the request is received can be generated based on the tables in the database and the relationships between the tables and/or can be stored in any format which preserves the information regarding the plurality of entities and the plurality of directed edges connecting the plurality of entities. For example, an entity object can be generated for each table in the database schema and each of the directed edges can be stored in an edge object or as edge data.

Additionally, the entity graph can be implicit in the information already stored in the database and may not require generation. For example, any child-parent relationships among tables in the plurality of tables of the database will already be represented in the database through the use of a foreign key in the child table pointing to a primary key in the parent table. This information can be utilized to represent the entities corresponding to the child table and the parent table and the directed edge between them. The same type of information for all tables in the database can be utilized to represent all child-parent relationships and entities throughout the database.

The entity graph can be represented by a plurality of data structures (which can be generated from the database tables/schema or implicit in the data structures for the database tables). For example, the entity graph can include a plurality of entity data structures corresponding to the database tables and a plurality of edge data structures corresponding to the relationships between the database tables. For example, the entity data structure can include a reference or link to the table in database which the entity data structure corresponds to or the entity data structure can be some portion of the corresponding database table. Additionally the edge data structure can include information corresponding to the direction of the edge, such as the "from" entity and the "to" entity. Optionally, the information regarding the plurality of directed edges can be stored as part of the entity data structures. For example, the entity data structure can include one or more edge data structures corresponding to directed edges connected to the corresponding entity in the entity graph.

Returning to FIG. 2, at optional step 202, the entity graph can be condensed to remove one or more cycles. Of course, if the entity graph does not include any cycles, then this step can be omitted.

Figure 5:
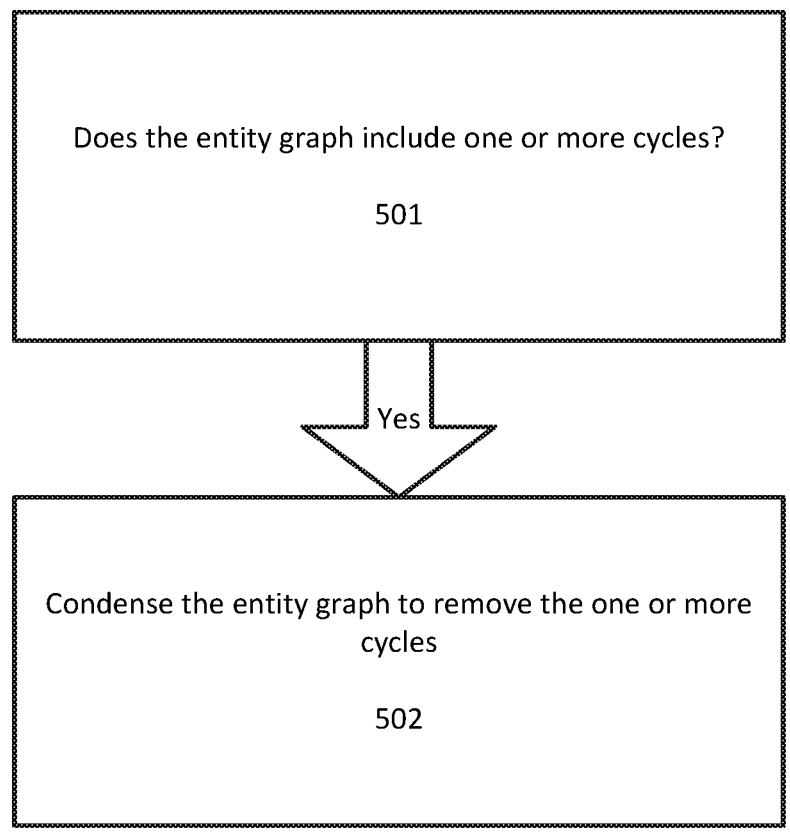
FIG. 5 illustrates a flowchart for identifying and removing one or more cycles from an entity graph according to an exemplary embodiment.

FIG. 5 illustrates a flowchart for identifying and removing one or more cycles from the entity graph according to an exemplary embodiment. At step 501 it is determined whether the entity graph includes one or more cycles, where a cycle comprises a cyclical sequence of entities in the plurality of entities which are connected by a cyclical sequence of one or more directed edges in the plurality of directed edges. An entity graph contains cycles if there is a path $E_1 \rightarrow \ldots E_1$ where each $E_i$ represents an entity and each arrow is a relationship edge. Cycles can be detected through a variety of means. For example, all possible outgoing paths from each entity can be traversed to determine whether any path leads back to the original entity.

The components of a graph which form a cycle are said to be strongly connected. Strongly connected components (cycles within the graph) can be identified using, for example, Tarjan's algorithm for finding strongly connected components. This algorithm takes a directed graph as input, and produces a partition of the graph's vertices into the graph's strongly connected components. Tarjan's algorithm performs a single pass of depth first search. It maintains a stack of vertices that have been explored by the search but not yet assigned to a component, and calculates "low numbers" of each vertex (an index number of the highest ancestor reachable in one step from a descendant of the vertex) which it uses to determine when a set of vertices should be popped off the stack into a new component. Each vertex of the graph appears in exactly one of the strongly connected components. Any vertex that is not on a directed cycle forms a strongly connected component all by itself: for example, a vertex whose in-degree or out-degree is 0, or any vertex of an acyclic graph.

Of course, other algorithms for identifying strongly connected components (cycles) within the entity graph can also be utilized, such as Kosaraju's algorithm, which uses two passes of depth first search or an algorithm that uses depth-first search in combination with two stacks, one to keep track of the vertices in the current component and the second to keep track of the current search path.

If the entity graph includes one or more cycles, then at step 502 of FIG. 5, the entity graph is condensed to remove the one or more cycles. The condensation of the entity graph can be performed on the data structures corresponding to the entity graph. For example, one or more entity data structures can be combined to create a new combined entity data structure and new edge data structures can be created corresponding to the combined entity data structure. Alternatively, existing edge data structures can be transformed so that they reference a combined entity data structure rather than an entity data structure which is part of a cycle.

Figure 6:
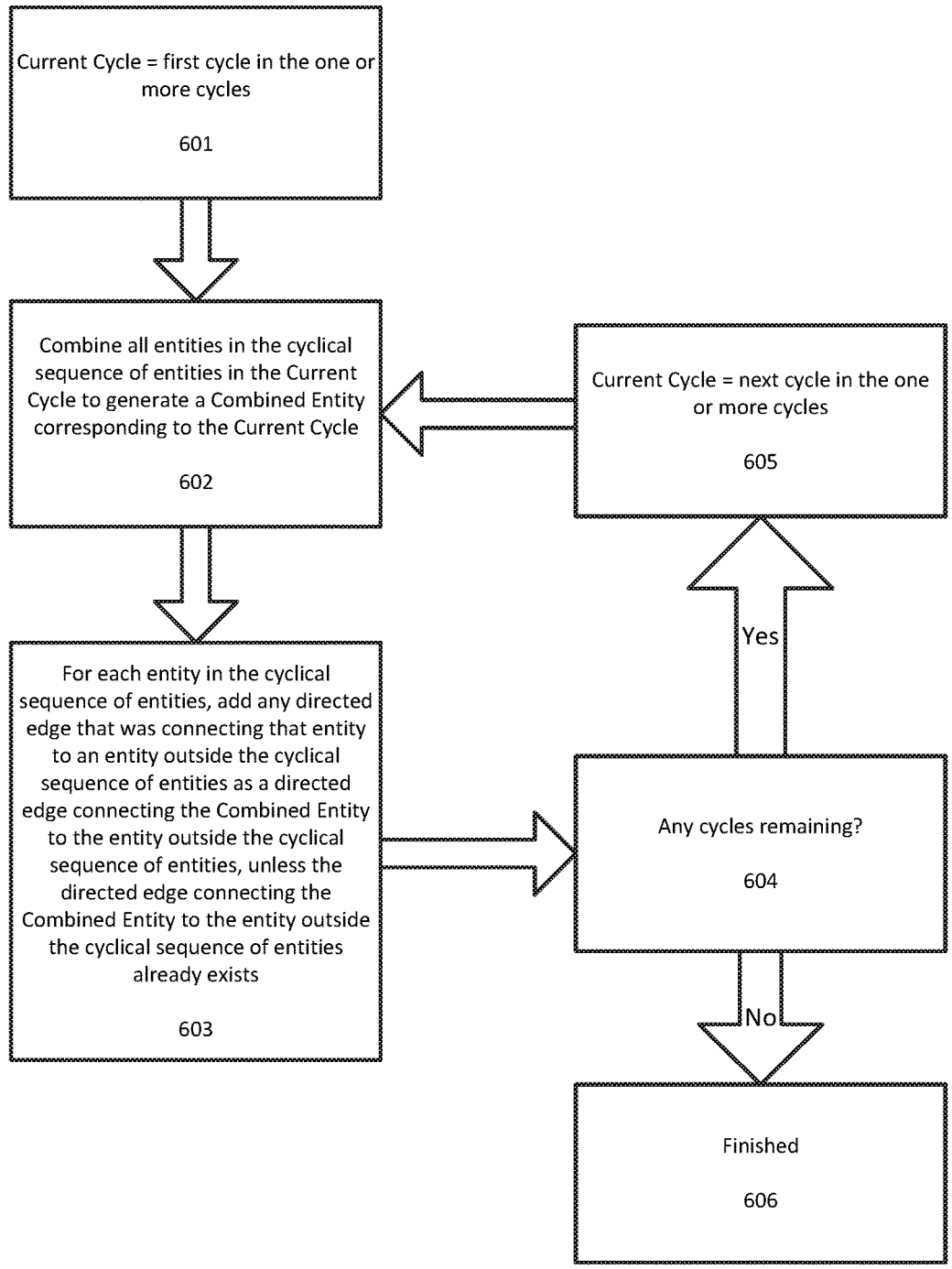
FIG. 6 illustrates a flow chart for condensation of an entity graph to remove the one or more cycles according to an exemplary embodiment.

This condensation step is shown in FIG. 6, which illustrates a flow chart for condensing the entity graph to remove the one or more cycles. At step 601, the Current Cycle is set to the first cycle in the one or more cycles. At step 602 all entities in the cyclical sequence of entities in the Current Cycle are combined to generate a Combined Entity corresponding to the Current Cycle. There is no inherent ordering of the entities in a Combined Entity which corresponds to a cycle/strongly connected component. The order in which the cycle is traversed would depend on the order of the data flow from the criterion entity. The data will form a hierarchy depending on the direction of traversal.

At step 603, for each entity in the cyclical sequence of entities, any directed edge connecting that entity to an entity outside the cyclical sequence of entities is added as a directed edge connecting the Combined Entity to the entity outside the cyclical sequence of entities, unless the directed edge connecting the combined entity to the entity outside the cyclical sequence of entities already exists (it has already been added to the combined entity). At step 604 it is determined whether there are any cycles remaining in the one or more cycles. If so, then at step 605 the Current Cycle is set to the next cycle in the one or more cycles and the process is repeated starting at step 602. Otherwise, the process for condensing the entity graph completes at step 606.

Figure 7:
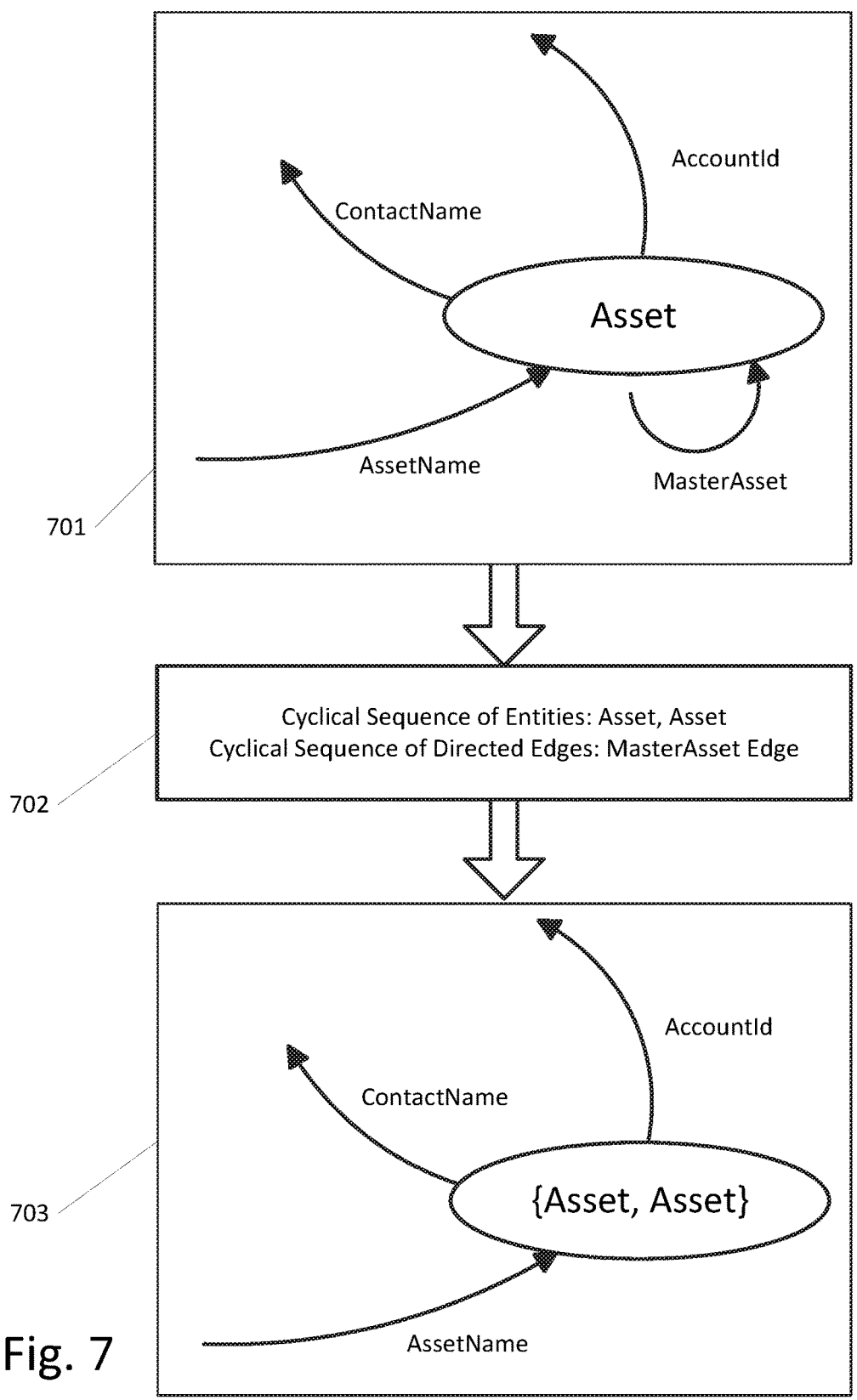
FIG. 7 illustrates the entity graph condensation process for a cycle in an entity graph according to an exemplary embodiment.

FIG. 7 illustrates the entity graph condensation process for a cycle, shown in box 701, which is present in the entity graph 400 of FIG. 4. In this case, as shown in box 702, the Cyclical Sequence of Entities in the cycle is: Asset, Asset (since the Asset entity points back to itself). Additionally, the Cyclical Sequence of Directed Edges is just the MasterAsset Edge which points from Asset to Asset.

Figure 8:
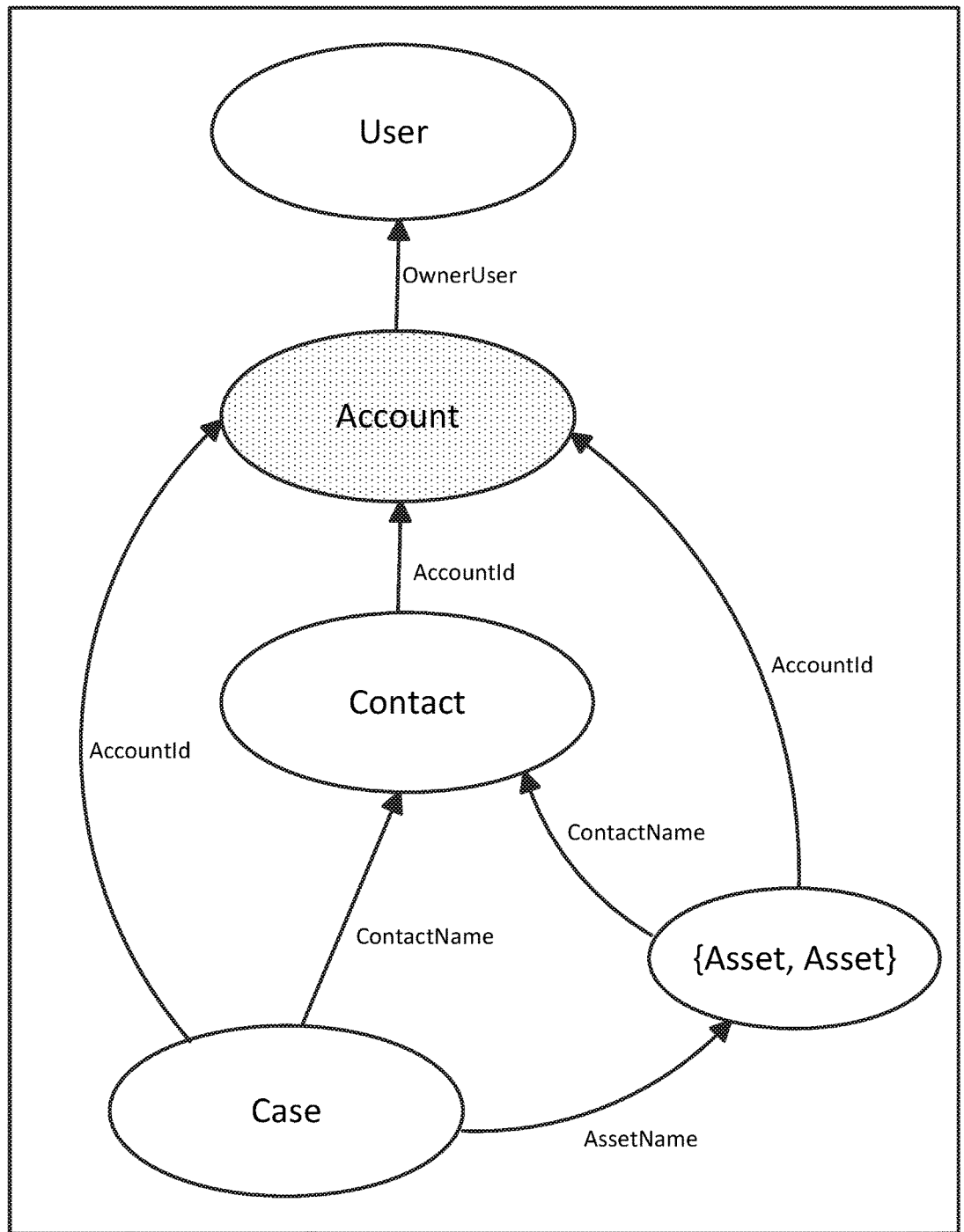
FIG. 8 illustrates a condensed entity graph corresponding to the entity graph of FIG. 4 according to an exemplary embodiment.

As shown in box 703, the entities in the cyclical sequence of entities of the cycle are combined to generate a combined entity corresponding to the cycle. This combined entity is shown in brackets {Asset, Asset}. Additionally, all incoming and outgoing directed edges to the Asset entity have been added as incoming and outgoing edges to the {Asset, Asset} entity. FIG. 8 illustrates the resulting condensed entity graph 800 which is generated when the Asset-Asset cycle in the entity graph 400 of FIG. 4 is condensed.

Figure 9:
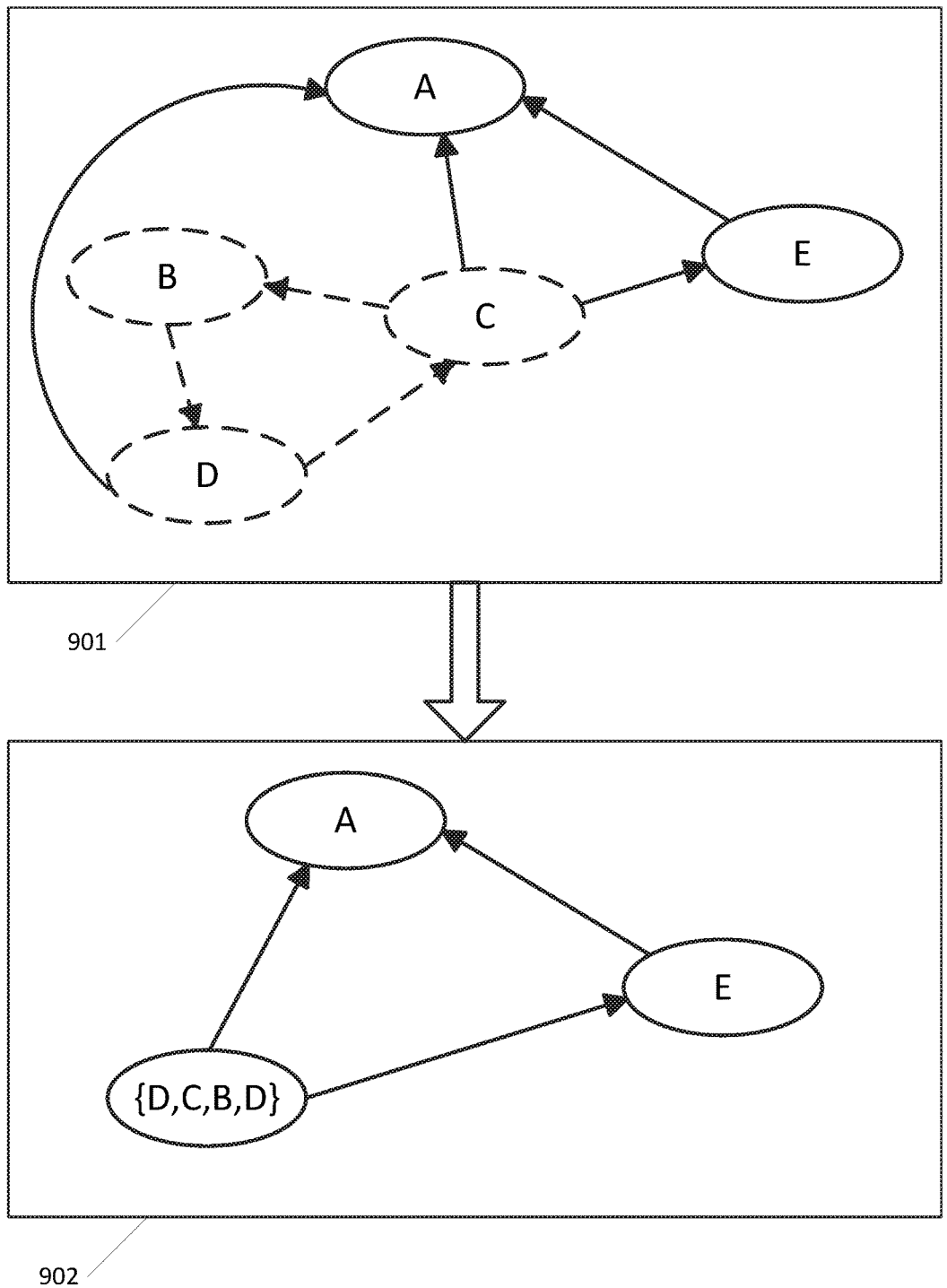
FIG. 9 illustrates another example of entity graph condensation according to an exemplary embodiment.

FIG. 9 illustrates another example of entity graph condensation according to an exemplary embodiment. Entity graph 901 contains the cycle including cyclical sequence of entities D, C, B, D (denoted D-C-B-D). As discussed earlier, there is no inherent ordering of a cyclical sequence of entities/strongly connected component and the order of traversal is based on the data flow from the criterion entity. As will be discussed further in the section on edge ordering and processing, when a cyclical sequence of edges is encountered, commands corresponding to all the edges present in the cyclic component are run in a loop until there is no new selection. After the loop is completed (there is no new selection), subset processing then proceeds to the next edge.

Entity graph 902 is the condensed entity graph of entity graph 901 in which cycle D-C-B-D has been replaced with a combined entity {D,C,B,D}. As shown in entity graph 902, all of the incoming and outgoing directed edges from each of entities D, C, and B to entities outside the cyclical sequence of entities have been added as incoming and outgoing directed edges to the combined entity {D,C,B,D}.

Returning to FIG. 2, at step 203, one or more directed edges in the plurality of directed edges that must be traversed in both directions in order to traverse all entities in the entity graph starting from the criterion entity corresponding to the criterion table are determined. As will be explained below, the one or more directed edges correspond to a minimum quantity of directed edges that must be traversed in both directions in order to traverse all entities in the entity graph starting from the criterion entity.

To ensure that all the objects in the graph are reachable from the criterion object, a set of edges may need to be traversed in both directions. As discussed earlier, traversing an edge from the parent-to-child direction is not required for maintaining referential integrity. Traversing an edge from parent-to-child can lead to additional child record selection and has the added cost of joins. However, it may be required to ensure that a subset is obtained for all objects in the schema. It is therefore desirable to minimize the number of edges that should be traversed in both directions (child-to-parent and parent-to-child) to span the entire graph.

Figure 10:
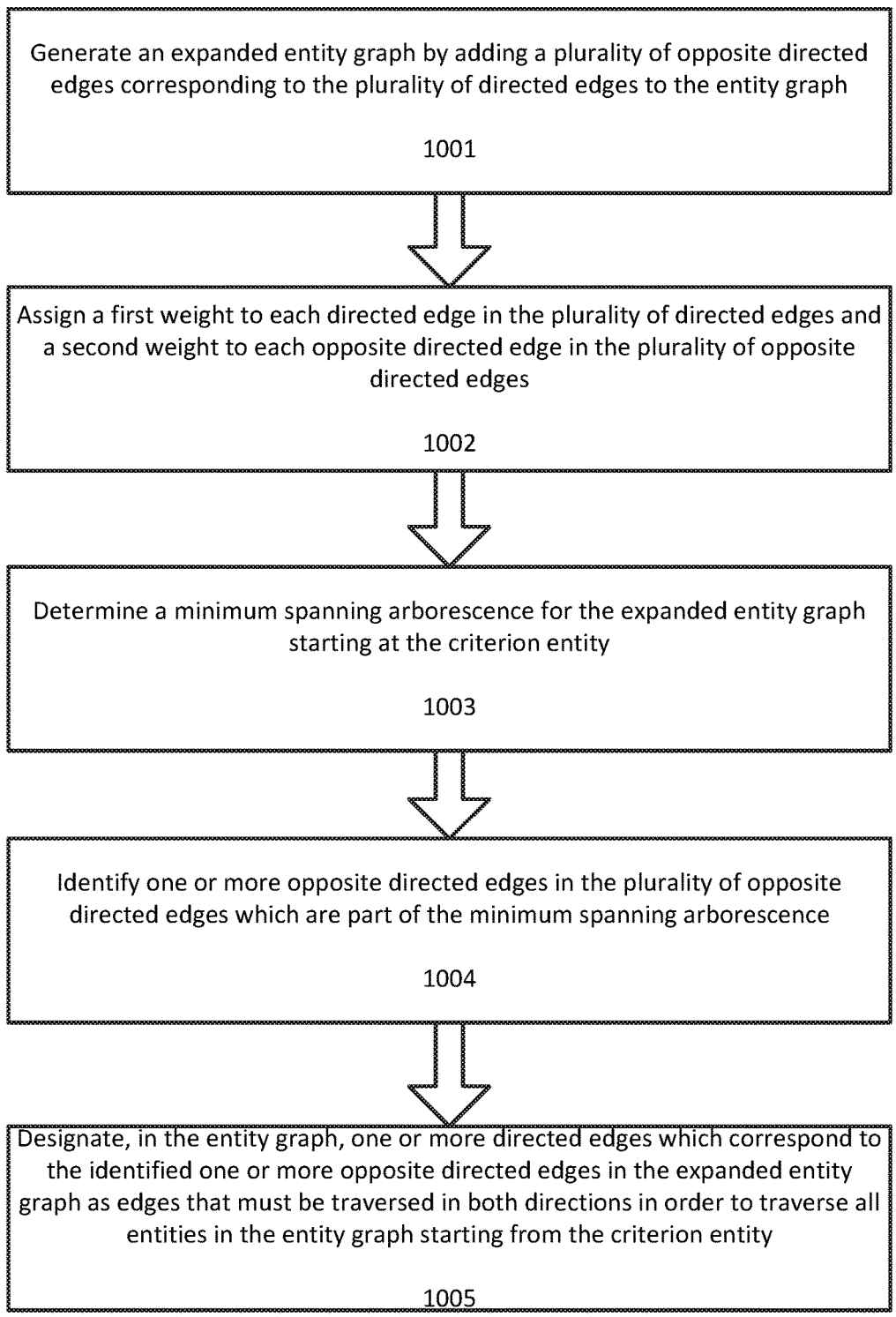
FIG. 10 illustrates a flowchart for determining one or more directed edges in the plurality of directed edges that must be traversed in both directions in order to traverse all entities in the entity graph starting from the criterion entity according to an exemplary embodiment.

FIG. 10 illustrates a flowchart for determining one or more directed edges in the plurality of directed edges that must be traversed in both directions in order to traverse all entities in the entity graph starting from the criterion entity according to an exemplary embodiment.

At step 1001 an expanded entity graph is generated by adding a plurality of opposite directed edges to the entity graph, wherein the plurality of opposite directed edges correspond to the plurality of directed edges and wherein each opposite directed edge in the plurality of opposite directed edges runs in a direction opposite to that of a corresponding directed edge in the plurality of directed edges.

The expanded entity graph can be generated by modifying the entity data structures or the edge data structures in the original entity graph to add new data structures corresponding to the additional edges.

Figure 11:
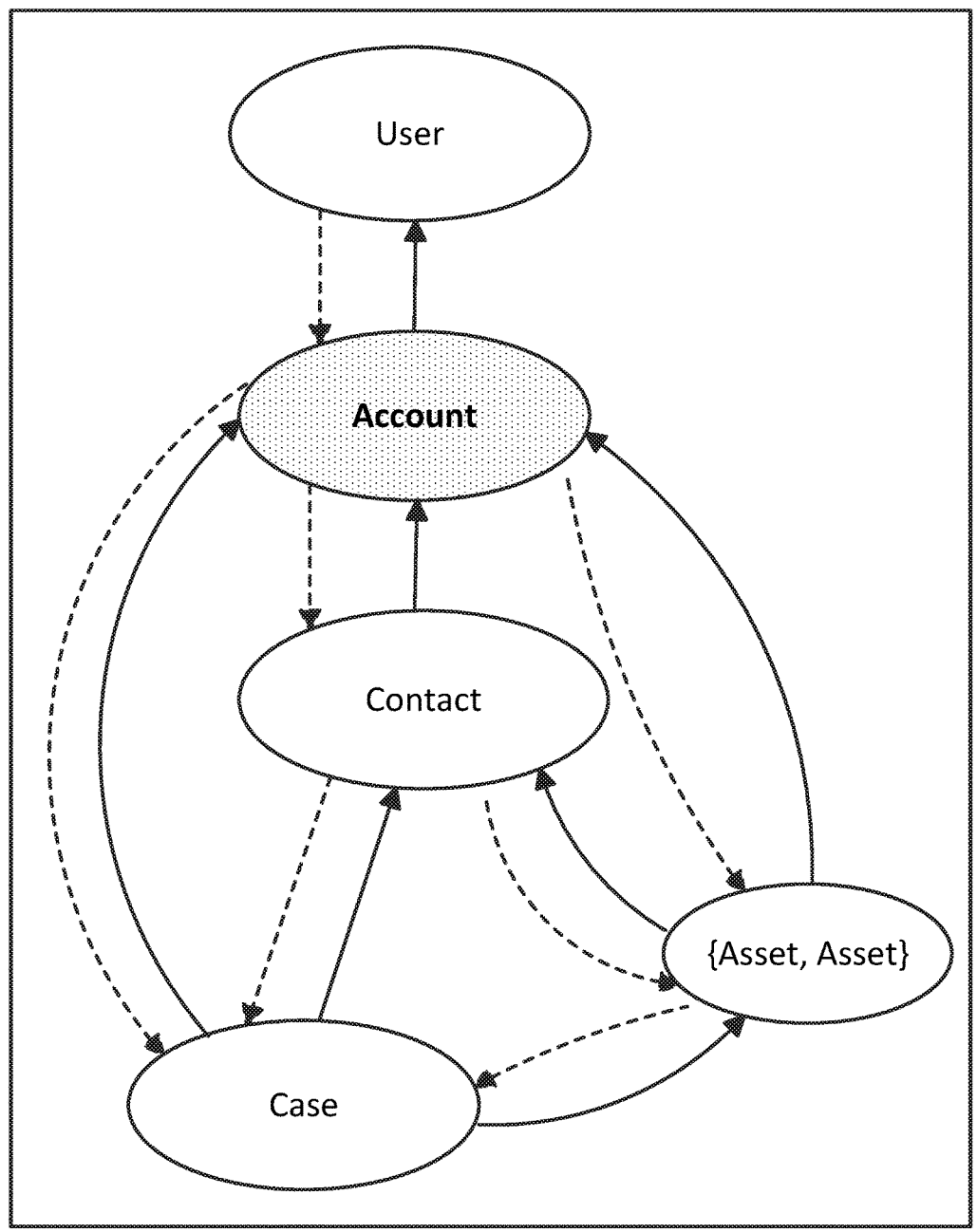
FIG. 11 illustrates an expanded entity graph including a plurality of opposite directed edges according to an exemplary embodiment.

FIG. 11 illustrates an expanded entity graph 1100 including a plurality of opposite directed edges that have been added to the entity graph 800 shown in FIG. 8. As shown in FIG. 11, the plurality of opposite directed edges are shown in dashed lines and the original plurality of directed edges are shown in solid lines. For clarity, the column names of the foreign keys corresponding to each edge are not shown in FIG. 11.

Returning to FIG. 10, at step 1002, a first weight is assigned to each directed edge in the plurality of directed edges in the expanded entity graph and a second weight is assigned to each opposite directed edge in the plurality of opposite directed edges in the expanded entity graph. The second weight is greater than a combined weight assigned to all directed edges in the plurality of directed edges. In other words, the second weight is greater than all of the combined first weights for all directed edges in the plurality of directed edges. The weight for each directed edge and opposite directed edge can be stored as an attribute which part of each edge data structure.

Figure 12:
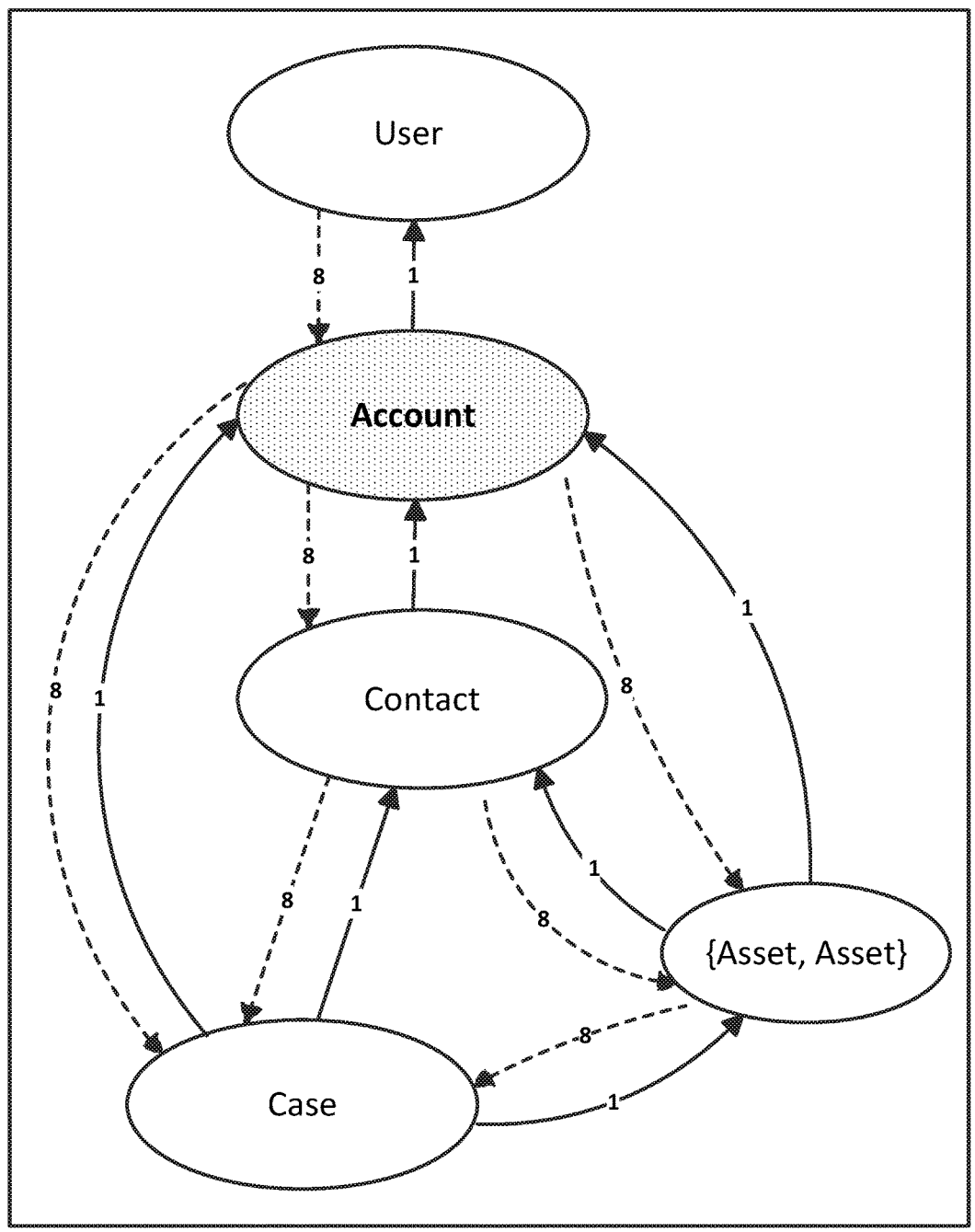
FIG. 12 illustrates a weighted expanded entity graph according to an exemplary embodiment.

For example, FIG. 12 illustrates an expanded entity graph 1200 corresponding to the entity graph 1100 in FIG. 11, in which each directed edge in the plurality of directed edges in the original entity graph (the entity graph prior to expansion and after any condensation, if required) has been assigned a weight of 1 and in which each opposite directed edge (added as part of the expansion) is assigned a weight of 8. As there were 7 directed edges in the original entity graph 800 (shown in FIG. 8) prior to expansion, and each directed edge is assigned a weight of 1, the combined weight assigned to all directed edges in the plurality of directed edges is 7. Therefore, each opposite directed edge is assigned a weight (8), which is greater than the combined weight assigned to all directed edges in the plurality of directed edges (7).

At step 1003 of FIG. 10, a minimum spanning arborescence for the expanded entity graph starting at the criterion entity is determined.

In graph theory, an arborescence is a directed graph in which, for a vertex u called the root and any other vertex v, there is exactly one directed path from u to v. A spanning tree of an undirected graph G is a subgraph that is a tree which includes all of the vertices of G. A minimum spanning tree is a spanning tree of a connected, undirected graph which connects all the vertices together with the minimal total weighting for its edges. A minimum spanning arborescence is the equivalent of a minimum spanning tree for a directed graph. In other words, a minimum spanning arborescence is a spanning arborescence of minimum weight.

The process of determining a minimum spanning arborescence for the expanded entity graph starting at the criterion entity comprises determining a collection of directed edges from the criterion entity to traverse such that all entities in the expanded entity graph are reached while minimizing the total weight of the directed edges traversed.

Chu Liu/Edmonds algorithm can be used to find the minimum spanning arborescence rooted at the criterion entity. Chu Liu/Edmonds algorithm is an algorithm for finding a spanning arborescence of minimum weight (sometimes called an optimum branching). It is the directed analog of the minimum spanning tree problem. The algorithm takes as input a directed graph $D=\langle V|E\rangle$ where V is the set of nodes and E is the set of directed edges, a distinguished vertex r∈V called the root, and a real-valued weight w(e) for each e∈E. It returns a spanning arborescence A rooted at r of minimum weight, where the weight of an arborescence is defined to be the sum of its edge weights $w(A)=\Sigma_{e\in A}w(e)$.

In this case, the algorithm would take as input the expanded entity graph, which includes the plurality of entities and the plurality of directed edges and the plurality of opposite directed edges, the criterion entity as the root vertex r, and the edge weights for each of the directed edges and opposite directed edges.

Figure 13:
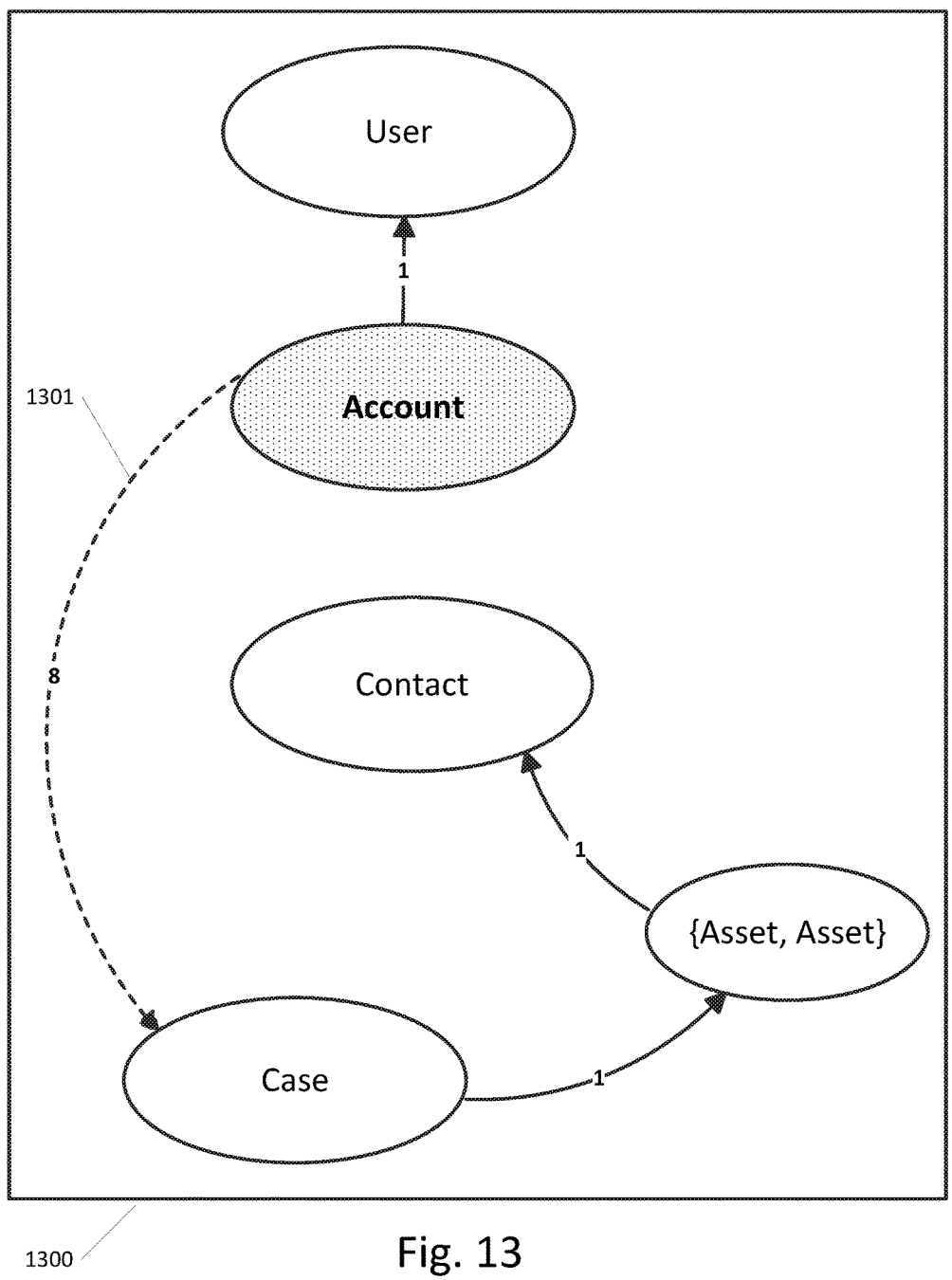
FIG. 13 illustrates a minimum spanning arborescence the expanded entity graph of FIG. 12 according to an exemplary embodiment.

The result of applying the Chu Liu/Edmonds algorithm to the expanded entity graph 1200 of FIG. 12 is shown in FIG. 13. FIG. 13 illustrates the minimum spanning arborescence 1300 of the expanded entity graph 1200 of FIG. 12. As shown in FIG. 13 the minimum spanning arborescence 1300 includes the following edges (denoted in direction of traversal): Account-User, Account-Case, Case-Asset, and Asset-Contact.

Returning to FIG. 10, after the minimum spanning arborescence has been determined, at step 1004, one or more opposite directed edges in the plurality of opposite directed edges which are part of the minimum spanning arborescence are identified. As shown in FIG. 13, the only opposite directed edge which is part of the minimum spanning arborescence is the Account-Case edge 1301.

At step 1005, one or more directed edges which correspond to the identified one or more opposite directed edges in the expanded entity graph are designated, in the (unexpanded) entity graph, as edges that must be traversed in both directions in order to traverse all entities in the entity graph starting from the criterion entity As discussed above, the only opposite directed edge in the expanded entity graph of FIGS. 11-12 which is part of the minimum spanning arborescence of FIG. 13 is edge Account-Case. The directed edge in the expanded entity graph which corresponds to that opposite directed edge is Case-Account. Therefore, as shown in entity graph 1400 in FIG. 14, the Case-Account edge 1401 is marked 1402 for traversal in the opposite direction (traversal in the parent-child direction). The set of original edges thus designated is the smallest set of edges that must be traversed in both directions so as to traverse the entire graph.

In addition to, or as an alternative to, the process shown in FIG. 10, the one or more edges in the entity graph which are designated for traversal in both directions can be determined based on input from a user. For example, a user could provide input or make a selection in a user interface to designate which edges they would like to be traversed in both directions (the edges for which they would like to have child record selection). The edges can also be marked based on the cost of joins/number of related records in the objects joined by the edge or any other criteria based on the performance of the subset operation or the size of subset required.

Returning to FIG. 2, at step 204 an ordered list of edges for the entity graph is generated based at least in part on the one or more directed edges that must be traversed in both directions and a topological ordering of the plurality of entities in the entity graph. This ordered list of edges will be used to generate the sequence of database commands which will generate the data subset corresponding to the request.

Figure 15:
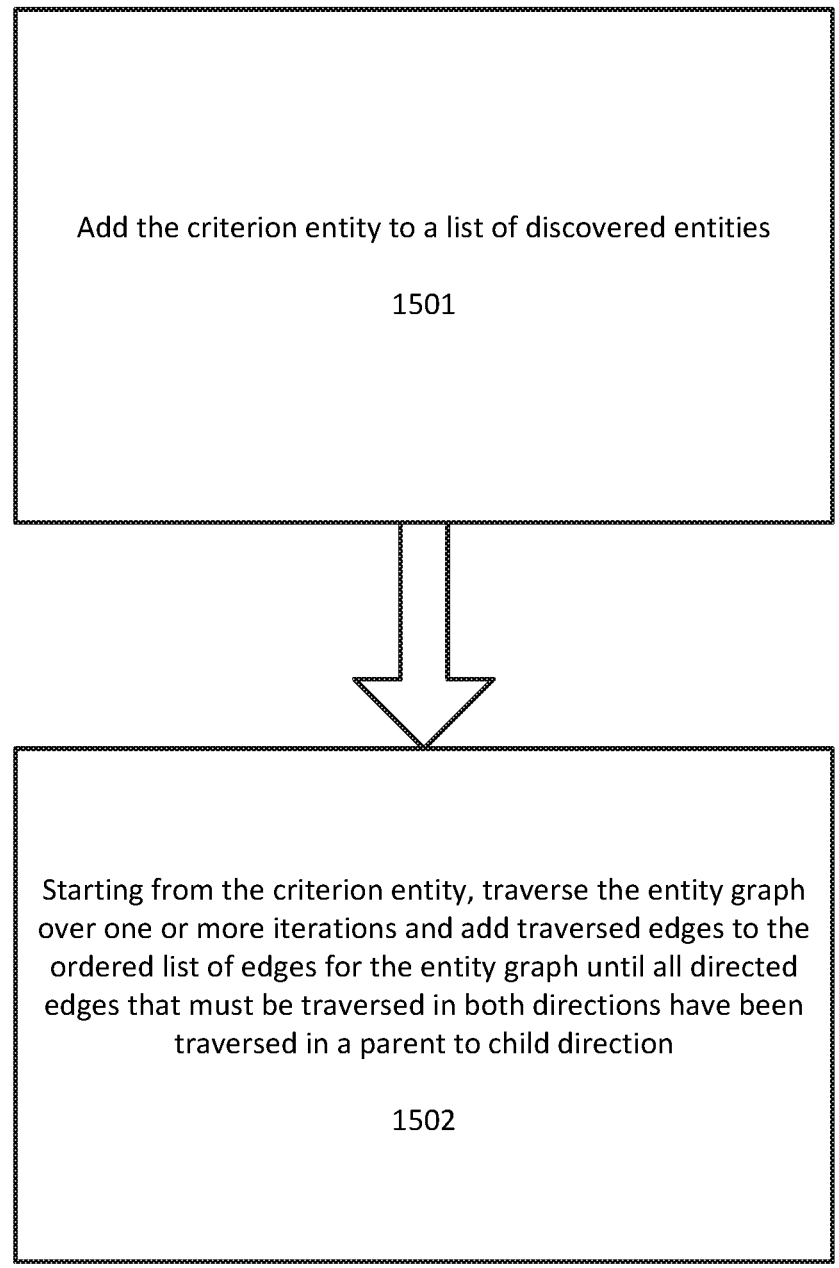
FIG. 15 illustrates a flowchart for generating an ordered list of edges for the entity graph based at least in part on the one or more directed edges that must be traversed in both directions and a topological ordering of the plurality of entities in the entity graph according to an exemplary embodiment.

FIG. 15 illustrates a flowchart for generating an ordered list of edges for the entity graph based at least in part on the one or more directed edges that must be traversed in both directions and a topological ordering of one or more entities in the entity graph according to an exemplary embodiment.

At step 1501 the criterion entity is added to a list of discovered entities. At step 1502, starting from the criterion entity, the entity graph is traversed over one or more iterations and traversed edges are added to the ordered list of edges for the entity graph until all directed edges that must be traversed in both directions have been traversed in a parent to child direction. As discussed below, each iteration in the one or more iterations includes a first phase and a second phase.

The first phase of each iteration includes traversing, in a parent to child direction, at least one directed edge in the directed edges that must be traversed in both directions, the at least one directed edge being an edge that has not already been traversed in a parent to child direction and which has a parent entity in the list of discovered entities.

FIG. 16A illustrates the process for the first phase of each iteration. At step 1601 any directed edges in the one or more directed edges that must be traversed in both directions, which have not already been traversed in a parent to child direction, and which have a parent entity in the list of discovered entities are traversed in a parent to child direction. Additionally, as part of the traversal in step 1601, the list of discovered entities is updated after each traversed edge to add each child entity of the traversed edge to the list of discovered entities (if it is not already in the list of discovered entities).

At step 1602 the traversed directed edges are added to the ordered list of edges in the order of traversal. In this step, the edges that are added are all in a parent to child direction and in the order of traversal.

The second phase of each iteration includes traversing, in a child to parent direction, any directed edges connected to any entities in the list of discovered entities and adding directed edges to the to the ordered list of edges for the entity graph based at least in part on a topological ordering of the entities in the list of discovered entities.

FIG. 16B illustrates the process for the second phase of each iteration. At step 1603 any directed edges which have a child entity in the list of discovered entities are iteratively traversed, in a child to parent direction. As part of the traversal in step 1603, the list of discovered entities is updated after each traversed edge to add each parent entity of the traversed edge to the list of discovered entities (if it is not already in the list of discovered entities).

At step 1604 any traversed directed edges which are not already in the ordered list of edges are added to the ordered list of edges based at least in part on a topological ordering of the entities in the list of discovered entities. This step can include adding any traversed directed edges which have a child entity with a lower topological sort position in the list of discovered entities prior to adding any traversed directed edges which have a child entity with a higher topological sort position.

A topological sort of a directed graph is a linear ordering of its vertices such that for every directed edge uv from vertex u to vertex v, u comes before v in the ordering. In this case, u would have a lower topological sort position than v.

The second phase of each iteration can optionally include steps 1605 and 1606. At optional step 1605, it is determined whether an entity in the list of discovered entities is a combined entity corresponding to a cyclical sequence of entities in the plurality of entities which are connected by a cyclical sequence of one or more directed edges. If so, then at optional sub-step 1606 the cyclical sequence of one or more directed edges is added to the ordered list of edges for the entity graph along with a loop indicator. The cyclical sequence of edges is added to the ordered list based at least in part on a topological ordering of the entities in the list of discovered entities. In other words, the position of the cyclical sequence of edges in the ordered list of edges will depend on the topological ordering of the entities connected to the cyclical sequence of edges within the topological ordering of the entities in the list of discovered entities.

The loop indicator marks a set of edges for traversal in a loop since the combined entity is the result of the condensation of sequence of entities corresponding to a loop. In this case, the subset for the tables corresponding to the entities in the loop will be generated by iteratively doing joins until no new records are selected.

If, after the second phase of each iteration, there are still edges remaining that must be traversed in both directions but have not been traversed in a parent to child direction, then another iteration is performed starting from entities added in the previous phase or iteration. The process completes when all edges that must be traversed in both directions have been traversed in a parent to child direction once. As will be discussed below, the second phase of each iteration ensures that these edges will also have been traversed in a child to parent direction (if there is new selection in the child entity through other edges).

Figure 14:
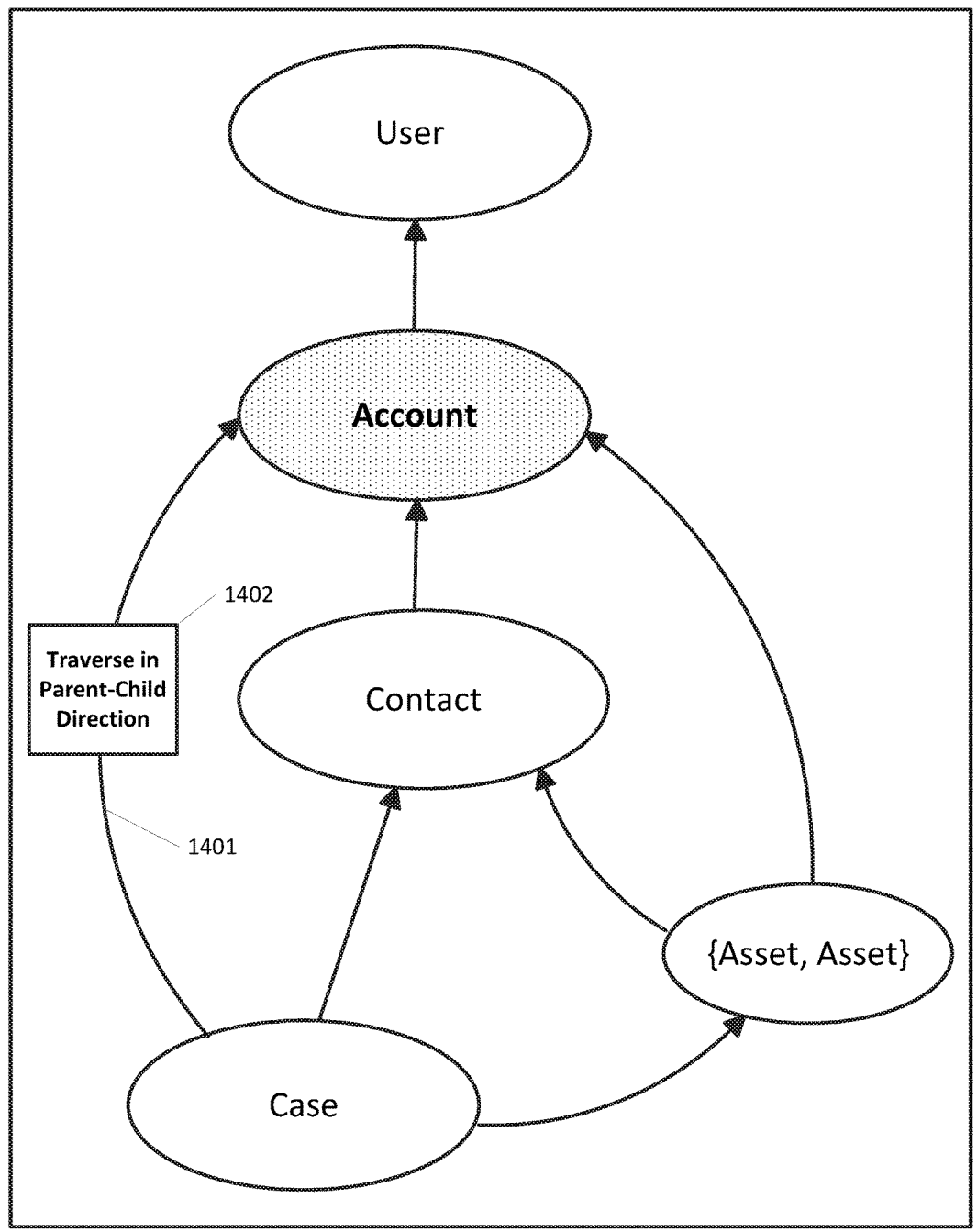
FIG. 14 illustrates the entity graph of FIG. 8 with one or more edges marked for traversal in both directions according to an exemplary embodiment.
Figure 17B:
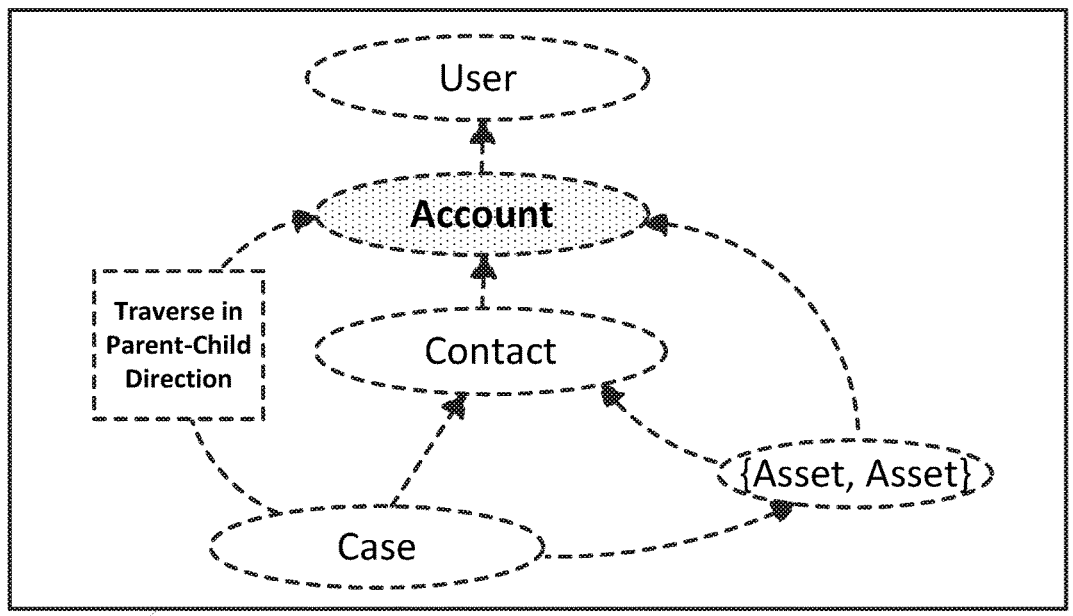

The generation of an ordered list of edges for the entity graph 1400 in FIG. 14 is illustrated in FIGS. 17A-17B. As discussed above, the first step in the process is that the criterion entity is added to a list of discovered entities. As shown in FIG. 17A, the first entity in the list of discovered entities 1702 is the criterion entity "Account" in the entity graph 1700.

FIG. 17A illustrates the results of the first phase of the iteration described with respect to FIGS. 15 and 16A. As discussed earlier, the first phase involves iteratively traversing, in a parent to child direction, any directed edges in the directed edges that must be traversed in both directions which have not already been traversed in a parent to child direction and which have a parent entity in the list of discovered entities. The first phase also includes updating the list of discovered entities is updated after each traversed edge to add each child entity of the traversed edge to the list of discovered entities and adding the traversed directed edges to the ordered list of edges in the order of traversal.

In this case, edge Case-Account has been designated for traversal in both directions. As the parent entity (Account) is in the list of discovered entities, this edge is traversed in a parent to child direction, from Account-Case. The child entity (Case) is then added to the list of discovered entities 1701 and the traversed edge (Account-Case) is added to the ordered list of edges 1701.

The addition of this parent-child edge to the ordered list is indicated in FIG. 17A by the dashed line around the marker on the Case-Account edge, which can correspond to a flag value that is updated once the Account-Case edge is added to the ordered list of edges. For example, a flag bit corresponding to the Account-Case edge can be set once the edge is added to the ordered list of edges. Alternatively, a parent-child flag which is used to signal child record retrieval for edge Case-Account can be switched off once edge Account-Case is added to the ordered list of edges.

Since there are no more directed edges that must be traversed in both directions, the process proceed to the second phase of the iteration described in FIG. 16B.

As discussed earlier, the second phase includes iteratively traversing, in a child to parent direction, any directed edges which have a child entity in the list of discovered entities, updating the list of discovered entities after each traversed edge to add each parent entity of the traversed edge to the list of discovered entities, and adding any traversed directed edges which are not already in the ordered list of edges to the ordered list of edges based at least in part on a topological ordering of entities in the list of discovered entities.

FIG. 17B illustrates the results of the second phase of the iteration. As shown in box 1700 of FIG. 17B, this results in all the remaining edges in the entity graph being traversed. As each child-parent edge is traversed, the parent entity is added to the list of discovered entities, and any edges which have that parent entity as a child entity are consequently traversed in a child to parent direction. For example, since the Case entity is initially in the list of discovered entities, the edges Case-Account, Case-Contact, and Case-{Asset, Asset} will be traversed. This leads to the discovery of the Contact and {Asset, Asset} entities. This then leads to the edges Contact-Account, Account-User, {Asset, Asset}-Contact, and {Asset, Asset}-Account being traversed and the User entity being discovered.

The list of discovered entities 1702 in FIG. 17B reflects all the entities discovered after the second phase. Additionally, the topologically sorted list of discovered entities 1703 indicates the topological ordering of the discovered entities, from lowest to highest. For example, the Case entity has the lowest topological sort position.

As shown in the ordered list of edges, the traversed edges are added to the ordered list based on the topological sort position of the child entities in each edge within the list of discovered entities. So, for example, child-parent edges where Case is the child are added before edges where Contact is the child.

Additionally, for any combined entities corresponding to a cyclical sequence of edges, the cyclical sequence of edges are added to the ordered list of edges based on the topologically sorted position of the discovered entities. Since Asset-Asset is a combined entity indicating a cycle, the cyclical sequence of one or more directed edges which make up the cycle are added to the ordered list of edges for the entity graph along with a loop indicator. This results in the addition of the Asset-Asset edge to the ordered list of edges.

In the situation where a child-parent edge has a combined entity as a parent, the first entity in the cyclical sequence of entities of the combined entity is listed as the parent in the ordered list of edges. For example, the edge from Case to {Asset, Asset} is added as Case-Asset. In the situation where a child-parent edge has a combined entity as a child, the last entity in the cyclical sequence of entities of the combined entity is listed as the child in the ordered list of edges. For example, the edge from {Asset, Asset} to Account is added as Asset-Account.

Next, any additional entities connected to any edges in the ordered list of edges are added to the list of discovered entities 1702. In this case, the additional entities include the Account entity, the Contact entity, and the Asset-Asset combined entity. FIG. 17B indicates the discovery of these entities with dashed lines around the corresponding entities in box 1700, which can correspond to flag values.

As discussed earlier, the discovery of entities is indicated with dashed lines around the entity in box 1700, which can correspond to flag values. Additionally, the addition of edges to the ordered list is indicated with dashed lines for the edge in box 1700, which can correspond to flag values.

As all edges have been added after the second phase, the process of generating the ordered list is complete after the second phase and no more iterations are performed. The ordered list of edges 1701 includes, in order, Account-Case, Case-Account, Case-Contact, Case-Asset, Asset-Asset [Loop], Asset-Contact, Asset-Account, Contact-Account, and Account-User. Since the second phase only considers topological ordering of the child entity, other valid ordered lists can be generated. For example, the list Account-Case, Case-Contact, Case-Account, Case-Asset, Asset-Asset [Loop], Asset-Account, Asset-Contact, Contact-Account, and Account-User would also be a valid list.

Figure 18A:
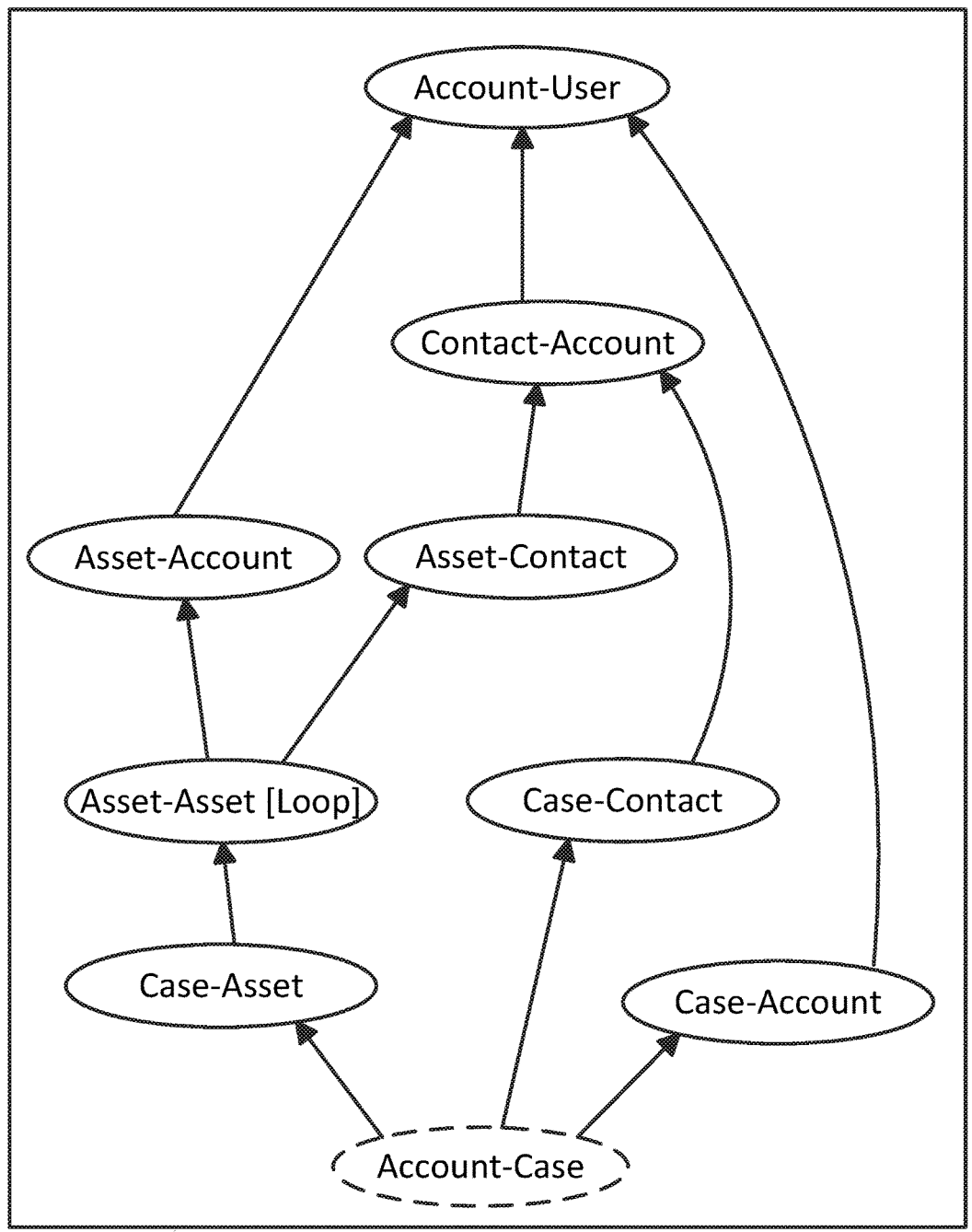
FIG. 18A illustrates an edge graph corresponding to the ordered list of edges according to an exemplary embodiment.

This ordering of edges obtained in an iteration can be represented as another directed acyclic graph whose nodes represent the edges in the schema graph and links represent the order in which the edges should appear in the sequence. Each iteration gives such a directed acyclic graph as the output. FIG. 18A illustrates the graph 1800 given by the first iteration for the example considered above. In this case, the parent-child edge Account-Case is indicated with dashed lines.

The ordering of edges can also be obtained from a topological sort on the edge ordering graph 1800. The nodes "Account-Case" and "Case-Account" represent the same edge but traversed in different directions. While an edge may repeat in multiple iterations, in a single iteration there will be only one occurrence of an edge in a given direction. The example considered above has only one iteration as there are no more edges left to traverse in the parent to child direction.

To further reduce the number of join operations, the following optimizations can be applied:

(1) In the edge graph 1800, if a node has only one incoming link and that link is from a node that represents the same edge traversed in the parent to child direction, then that node can be eliminated.

(2) All nodes that cannot be reached from the starting points of that iteration in an edge graph can be removed.

Figure 18B:
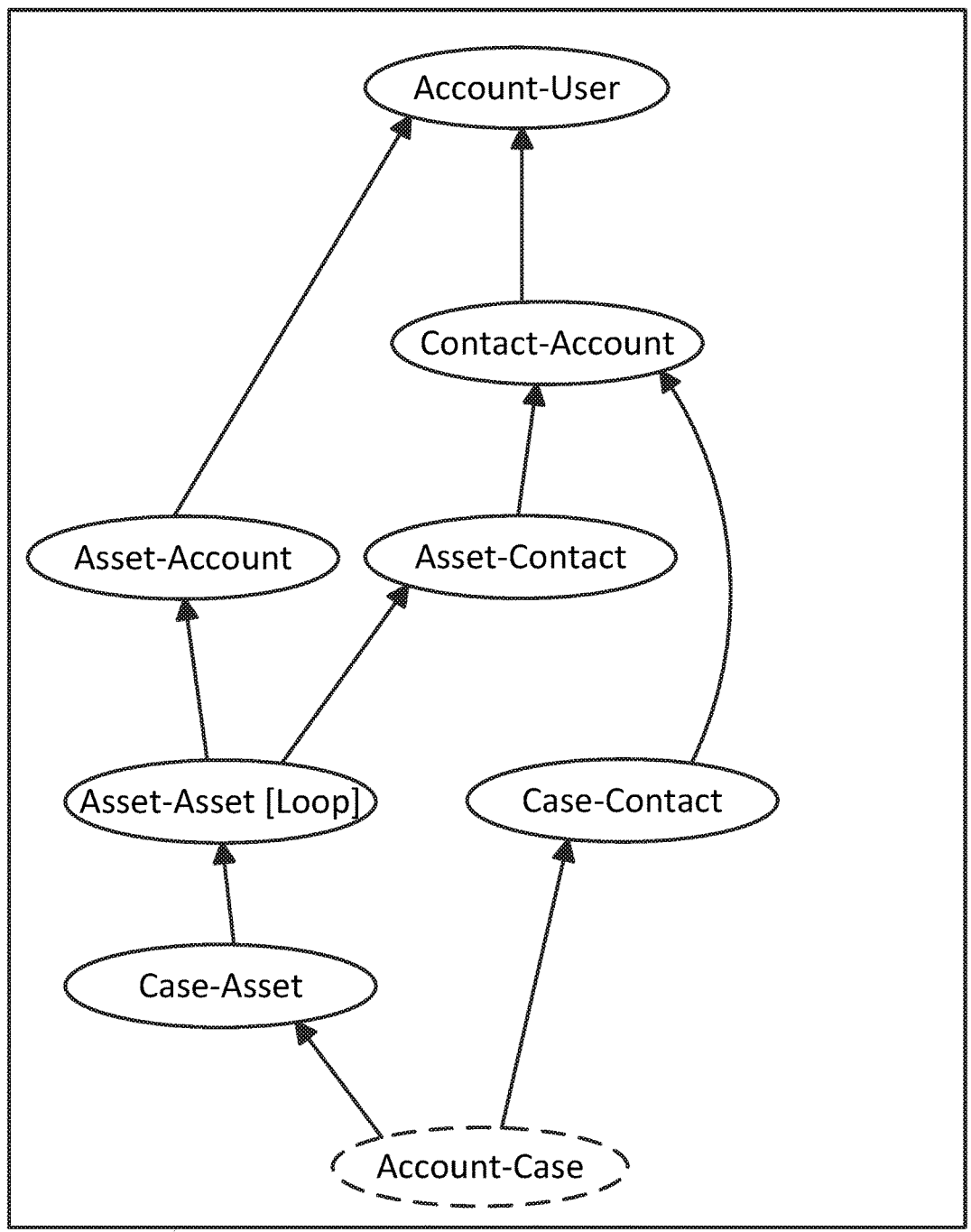
FIG. 18B illustrates an optimized edge graph corresponding to the ordered list of edges according to an exemplary embodiment.

For example, in the ordering graph 1800 in FIG. 18, the node "Case-Account" has only one incoming link and that is from another node "Account-Case" which represents the same edge in the schema graph. This node can be removed as the edge corresponding to it will not lead to any new selection in the subset. FIG. 18B illustrates the resulting optimized graph 1801. The ordered list of edges based on this optimization would be Account-Case, Case-Contact, Case-Asset, Asset-Asset [Loop], Asset-Contact, Asset-Account, Contact-Account, Account-User.

Figure 19:
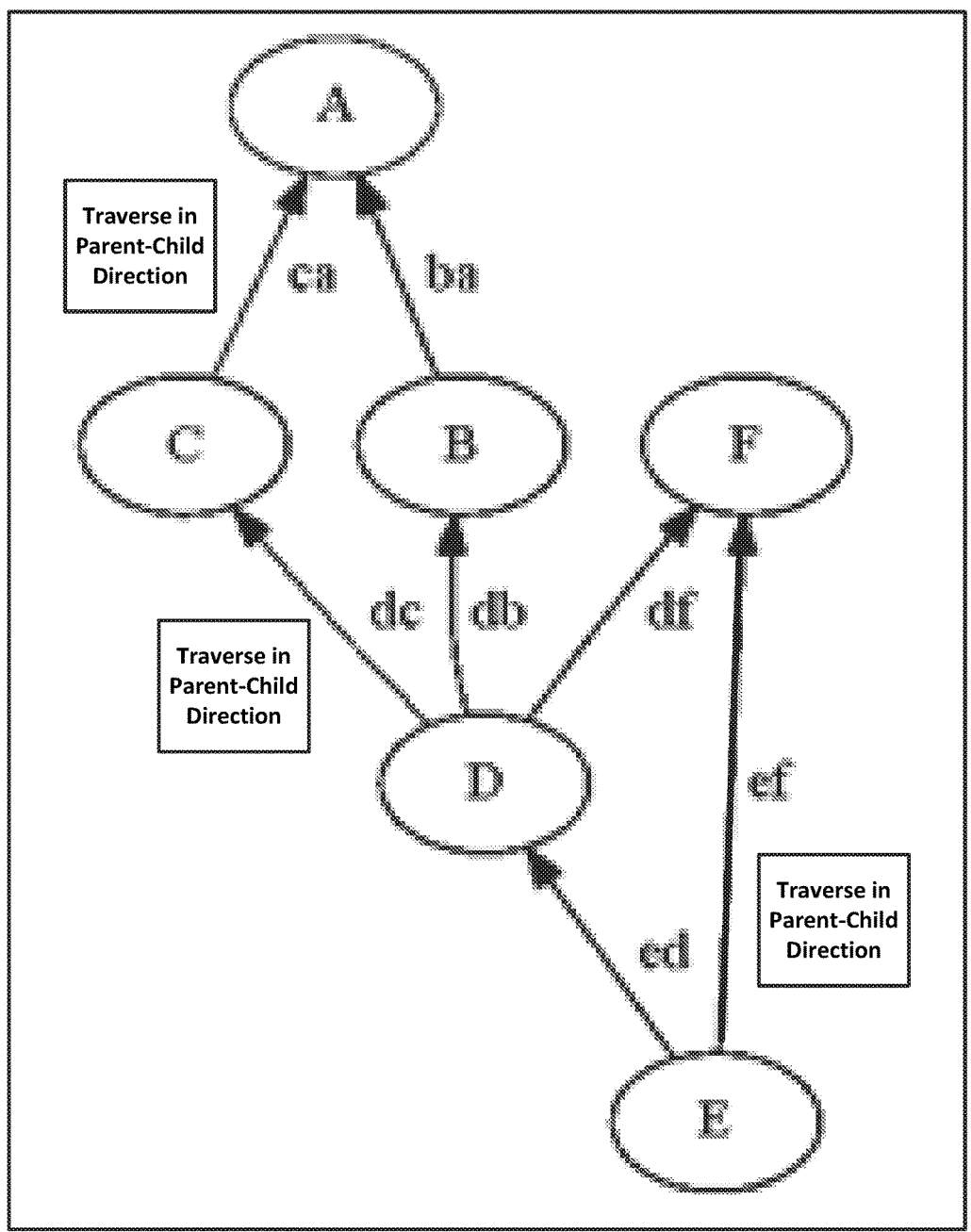
FIG. 19 illustrates another entity graph in which multiple iterations are required in order to generate an ordered list of edges according to an exemplary embodiment.

FIG. 19 illustrates an entity graph 1900 which requires more than one iteration to generate an ordered list of edges. As shown in FIG. 19, edges ca, dc, and of are marked for traversal in both directions (the inherent child-parent direction and an additional parent-child direction). The process for generating the ordered list of edges for entity graph 1900 is described below with reference to the various data structures that hold the relevant information, as well as the pertinent transformations and operations. Comments are indicated by a double forward slash "//" or between a slash and asterisk "/* . . . */".

```
markedEdges = {ca, dc, ef}    // Edges that must be traversed in a parent-child
                              // direction
/* First iteration */
// First phase
S = {A}    // Start vertices
// traverseEdgesParentToChild( )
visitedEdges = {ac, cd}       // Edge names spelled backwards to show direction
                              // of traversal
parentToChildSelection = {(C, 1), (D, 1)}    // Count of edges traversed that lead
                                             // to indicated child vertices in first
                                             // phase
R = V: {A, C, D}, E: {ac, cd}                // Reachable graph (graph vertices
                                             // discovered in first phase) and edges added
sortedVertices = {A, C, D}                   // Reversed after topological sort
parentToChildEdges = {ac, cd}
markedEdges = {ef}                           // Edges that have been traversed in parent to
                                             // child direction are removed from marked
                                             // edges
S = {C, D} // Start vertices for second phase
// Second phase
// traverseEdgesChildToParent( )
visitedEdges = {dc, ca, db, ba, df}
childToParentSelection = {(C, 1), (B, 1), (A, 2), (F, 1)}    // Count of edges
                                                              // traversed that lead
                                                              // to vertices in second
                                                              // phase
R = V: {A, C, D, B}, E: (ca, dc, ba, db, df)    // Reachable graph after
                                                 // second phase
sortedVertices = {D, B, C, A}    // Topologically sorted vertices
childToParentEdges = {dc, db, ca, ba, df}
// Remove redundant edges from childToParentEdges. Consider edges that are
// common in phase one and two
// Remove dc as the parent to child selection count of D is 1 and it doesn't have
// any child to parent selection
childToParentSelection = {(C, 0), (B, 1), (A, 2), (F, 1)}    // Updated child to
                                                              // parent selection
childToParentEdges = {db, ca, ba, df}
// Remove ca as the parent to child selection for C is 1 and child to parent
// selection is 0
childToParentSelection= {(C, 0), (B, 1), (A, 1), (F, 1)}     // Updated child to
                                                              // parent selection
```

```
childToParentEdges = {db, ba, df}
edgeOrder = {ac, cd, db, ba, df}        // Edge order after first iteration
S = {A, B, C, F}     // Updated start vertices
/* Second Iteration */
// First phase
// traverseEdgesParentToChild( )
visitedEdges = {fe}
parentToChildSelection = {(E, 1) }       // Count of edges traversed that lead to
                                         // vertices in first phase
R = V: {F, E}, E: {fe}    // Reachable graph (graph discovered in first phase)
sorted Vertices = {F, E}   // Reversed after topological sort
parentToChildEdges = {fe}
markedEdges = { }           // Edges that have been traversed in parent to child
                            // direction are removed from marked edges
S = {E, F} // Start vertices for second phase
// Second phase
// traverseEdgesChildToParent( )
visitedEdges = {dc, ca, db, ba, df, ed, ef}
childToParentSelection = {(D,1), (C, 1), (B, 1), (A, 2), (F, 2)}
// Count of edges traversed that lead to vertices in second phase
R = V: {A, C, D, B, E, F}, E: {ca, dc, ba, db, df, ed, ef}
// Reachable graph after second phase
sortedVertices = {E, F, D, B, C, A}        // Topologically sorted vertices
childToParentEdges = {ed, ef, dc, db, ca, ba, df}
// Remove redundant edges from childToParentEdges. Consider edges that are
// common in phase one and two
// Remove ef as the parent to child selection count of E is 1 and it doesn't have
// any child to parent selection
childToParentSelection = {(D, 1), (C, 1), (B, 1), (A, 2), (F, 1)}
// Updated child to parent selection
childToParentEdges = {ed, dc, db, ca, ba, df}
edgeOrder = {ac, cd, db, ba, df, fe, ed, dc, db, ca, ba, df     // Edge order after
                                                                //second iteration
// Iterations end as marked edges are now empty
```

The general process for generating an ordered list of edges from the entity graph and the one or more edges marked for traversal in both directions can be described in pseudo-code, as indicated below. Comments are indicated by a double forward slash "//" or between a slash and asterisk pair "/* ... */".

```
var G := (V, E)     // Input graph
var edgeOrder := empty
var C : = {condensedVertices}     // Strongly connected components that collapsed into one
                                   // vertex each in the previous phase
var S := {startVertex}
var startVertexHasParents := G.getOutgoingEdges(startVertex)
var markedEdges := getMarkedEdges(E)
firstIteration = true
parentToChildSelection := map<V,int>     // map to hold parent to child selection count for
                                          // each vertex
childToParentSelection := map<V,int>     // map to hold child to parent selection count for
                                          // each vertex
visitedEdges := set<E>        // Set that holds visited
function edgeOrder( ) {
  do {
    parentToChildSelection.clear( )
    visitedEdges.clear( );
    for each v in S {
      traverseEdgesParentToChild(v, parentToChildSelection, visitedEdges, G)
    }
    var R := graph(parentToChildSelection.keySet( ), visitedEdges)
    // Construct Reachable graph
    var sortedVertices := TopologicalSort(R)
    // Topologically sort vertices in the reachable graph
    var sortedVertices := reverse(sortedVertices);
    var parentToChildEdges := { }
    for each v in sortedVertices {
      for each edge e in R.getIncomingEdgesFor(v) {
        if(markedEdges.contains(e)) {
          parentToChildEdges.add(e);
          markedEdges.remove(e);
        }
      }
    }
    if(!firstIteration) {
      // Don't clear the vertices in first iteration as the start vertex may have
      // parent edges that need to be traversed in the second phase
```

```
      S.clear( );
    }
    // Vertices in which selection happened through parent edges become the start
    // vertices for the next phase
    S.addAll(parentToChildSelection.keySet( ));
    childToParentSelection.clear( )
    visitedEdges.clear( );
    for each v in S {
      traverseEdgesChildToParent(v, childToParentSelection, visitedEdges, G)
    }
    var R := graph(childToParentSelection.keySet( ), visitedEdges)
    // Construct Reachable graph
    var sortedVertices := TopologicalSort(R)
    // Topologically sort vertices in the reachable graph
    var childToParentEdges := { }
    for each v in sortedVertices {
      for each edge e in R.getIncomingEdgesFor(v) {
        if(R.contains(e.childVertex)) {
          childToParentEdges.add(e);
        }
      }
      if(v in condensedVertices) {
        // Add the edges from cyclic component if the vertex is a
        // condensed vertex
        childToParentEdges.addAll(G.getCondensedEdges(v));
      }
    }
    // Remove redundant edges: Edges that have already been traversed in the first
    // phase and traversing which will not lead to new data selection during the subset
    // process.When data is selected in the child object through a parent edge, new
    // data will not be selected in parent through the same edges unless data selection
    // in child object through other edges.
    var edges ToRemove = { }
    for each edge e in childToParentEdges {
      if(parentToChildEdges.contains(e)) {
        if(parentToChildSelection.containsKey(e.childVertex)) {
          if(parentToChildSelection.get(e.childVertex) == 1 &&
(!childToParentSelection.containsKey(e.childVertex) ||
childToParentSelection.get(e.childVertex) < 1)) {
            edgesToRemove.add(e);
            var selectionCount =
childToParentSelection.get(e.parentVertex);
            childToParentSelection.put(e.parentVertex,
selectionCount – 1);
          }
        }
      } else {
        if((!childToParentSelection.containsKey(e.childVertex) ||
(childToParentSelection.get(e.childVertex) < 1) &&
(!parentToChildSelection.containsKey(e.childVertex) ||
parentToChildSelection.get(e.childVertex) < 1) && !S.contains(e.childVertex)) {
          edgesToRemove.add(e);
          var selectionCount =
childToParentSelection.get(e.parentVertex);
          childToParentSelection.put(e.parentVertex, selectionCount
– 1);
        }
      }
    }
    childToParentEdges.removeAll(edgesToRemove);
    S.addAll(childToParentSelection.keySet( ));
    edgeOrder.addAll(parentToChildEdges);
    edgeOrder.addAll(childToParentEdges);
  } while (!markedEdges.isEmpty( ))
  return edgeOrder;
}
function traverseEdgesParentToChild(vertex, vertexSelectionCount, visitedEdges) {
  if(G.getIncomingEdgesFor(vertex) == null) {
    return; // No child edges
  }
  // Traverse incoming edges
  for each edge e inG.getIncomingEdgesFor(vertex) {
    if (e in markedEdges && !visitedEdges.contains(e)) {
      visitedEdges.add(e);
      /*
       * Update selection count for source vertex.
       */
      if (vertexSelectionCount.containsKey(e.childVertex))) {
        prevCount := vertexSelectionCount.get(e.childVertex);
```

```
            vertexSelectionCount.put(e.childVertex, prevCount + 1);
         } else {
            vertexSelectionCount.put(e.childVertex, 1);
         }
         traverseEdgesParentToChild(e.childVertex, vertexSelectionCount,
               visitedEdges);
      }
   }
}
function traverseEdgesChildToParent(vertex, vertexSelectionCount, visitedEdges) {
   if (G.getOutgoingEdgesFor(vertex) == null) {
      return; // No parent edges
   }
   if(v in condensedVertices) {
      /*
       *Update vertex selection count if it is a condensed vertex
       */
      if (vertexSelectionCount.containsKey(vertex) {
         vertexSelectionCount.put(vertex, vertexSelectionCount.get(vertex) + 1);
      } else {
         vertexSelectionCount.put(vertex, 1);
      }
   }
   // Traverse outgoing edges.
   for each edge e in G.getOutgoingEdgesFor(vertex) {
      if (!visitedEdges.contains(e)) {
         visitedEdges.add(e);
         /*
          * Update selection count for parent vertex.
          */
         if (vertexSelectionCount.containsKey(e.parentVertex( ))) {
            prevCount := vertexSelectionCount.get(e.parentVertex);
            vertexSelectionCount.put(e.parentVertex, prevCount + 1);
         } else {
            vertexSelectionCount.put(e.parentVertex, 1);
         }
         traverseEdgesChildToParent(e.parentVertex, vertexSelectionCount,
               visitedEdges);
      }
   }
}
```

Returning to FIG. 2, once the ordered list of edges is generated, at step 205, a subset of data from the plurality of tables is generated based at least in part on the ordered list of edges for the entity graph and the request.

Figure 20:
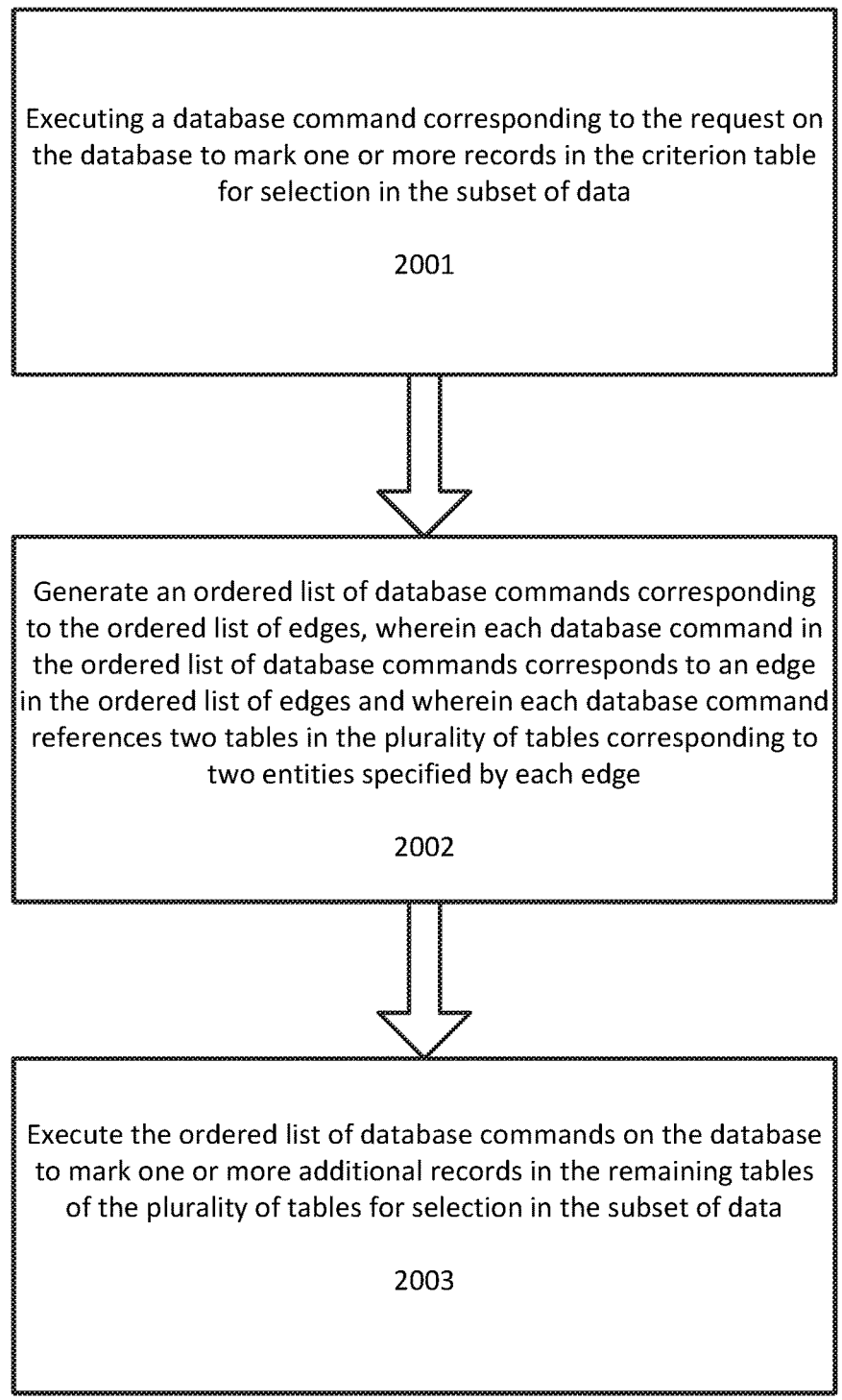
FIG. 20 illustrates a flow chart for generating a subset of data from the plurality of tables based at least in part on the ordered list of edges for the entity graph and the request according to an exemplary embodiment.

The process for generating a subset of data from the plurality of tables based at least in part on the ordered list of edges for the entity graph and the request is shown in FIG. 20.

At step 2001 a database command corresponding to the request on the database is executed to mark one or more records in the criterion table for selection in the subset of data. For example, if the request is a SELECT command with some selection criteria, then that command can be executed on the database to mark one or more records in the criterion table which meet the selection criteria. This can be done by setting a selection flag for the selected records. For example, as shown in FIG. 3B, the SELECT command in the request would be executed to mark the record Account.Id=314, Account.OwnerUser=Gary Mitchell for selection. This could be done by setting a flag field Account.FLAG=1 for that record.

At step 2002 of FIG. 20 a list of database commands corresponding to the ordered list of edges is generated. Each database command in the list of database commands corresponds to an edge in the ordered list of edges and each database command references two tables in the plurality of tables corresponding to two entities specified by each edge. This step converts the ordered list of edges into relational database join and update operations to compute the subset on a relational database. Of course, when one or more edges in the ordered list of edges are designated as a loop, then the database commands corresponding to the one or more edges can be placed in a loop so that they repeat until no new records are selected.

At step 2003 the ordered list of database commands are executed on the database to mark one or more additional records in the remaining tables of the plurality of tables for selection in the subset of data.

For example, assuming that there is a FLAG field in the criterion object which indicates the records selected in a subset and is already set based on the initial criterion applied on Account, the following command could be generated corresponding to the Account-Case edge in the ordered list of edges 1701 in FIG. 17B:

UPDATE Case SET FLAG=1 WHERE Case.Id IN (SELECT Id FROM Case WHERE Case INNER JOIN Account ON Case.AccountId=Account.Id WHERE Account.FLAG=1)

Upon execution, this command would mark additional records in the Case table for inclusion in the subset of data. Similarly, commands corresponding to the remaining edges in the ordered list of edges can be generated and executed to mark additional records for inclusion in the subset of data.

For an edge traversal that goes from child to parent, the parent table will be updated and for an edge traversal that goes from parent to child, the child table will be updated. The SQL operation mentioned above updates the child table. For the "Case-Contact" traversal, the generated command will update Account instead of Case:
UPDATE Contact SET FLAG=1 WHERE Contact.Id IN (SELECT Id FROM Contact WHERE Case INNER JOIN Contact ON Case.ContactId=Contact.Id WHERE Case.FLAG=1)

In the situation where the ordered list of edges includes edges that participate in cycles or a self-referencing edge cycle, then the joins for those edges are executed in a loop before proceeding to the next edge in the ordered list.

Additionally, if paths exist in the graph which may select an empty subset even with a non-empty set of initial records, then a user can manually mark the edges for child record selection to avoid the paths that lead to empty subset selection and the steps outlined above can be performed after user marks the edges.

The edge ordering of the present application is such that it guarantees that the subset selected by executing joins is referentially intact. Coupled with the edge behavior assignment (the designation of which edges to traverse in both directions) based on the minimum spanning arborescence rooted at the criterion entity, the present system allows for the generation of a subset with the fewest possible parent to child joins for obtaining the subset (and an overall lower number of joins as compared to other subsetting techniques) and hence the solution scales well for large and complex schemas.

In addition to relational databases, this system is applicable to other databases whose schema can be modeled as a graph and have record identifiers which can be staged on a relational database for subset computation. An important application of this system is computation of Salesforce data subsets as Salesforce schemas are quite complex and without a scalable and efficient mechanism, it is not possible to extract referentially intact subsets from Salesforce. The above discussed techniques and systems improve the functioning of a computer as well as the software executing on the computer by more efficiently identifying and generating data subsets based on a criterion.

Figure 21:
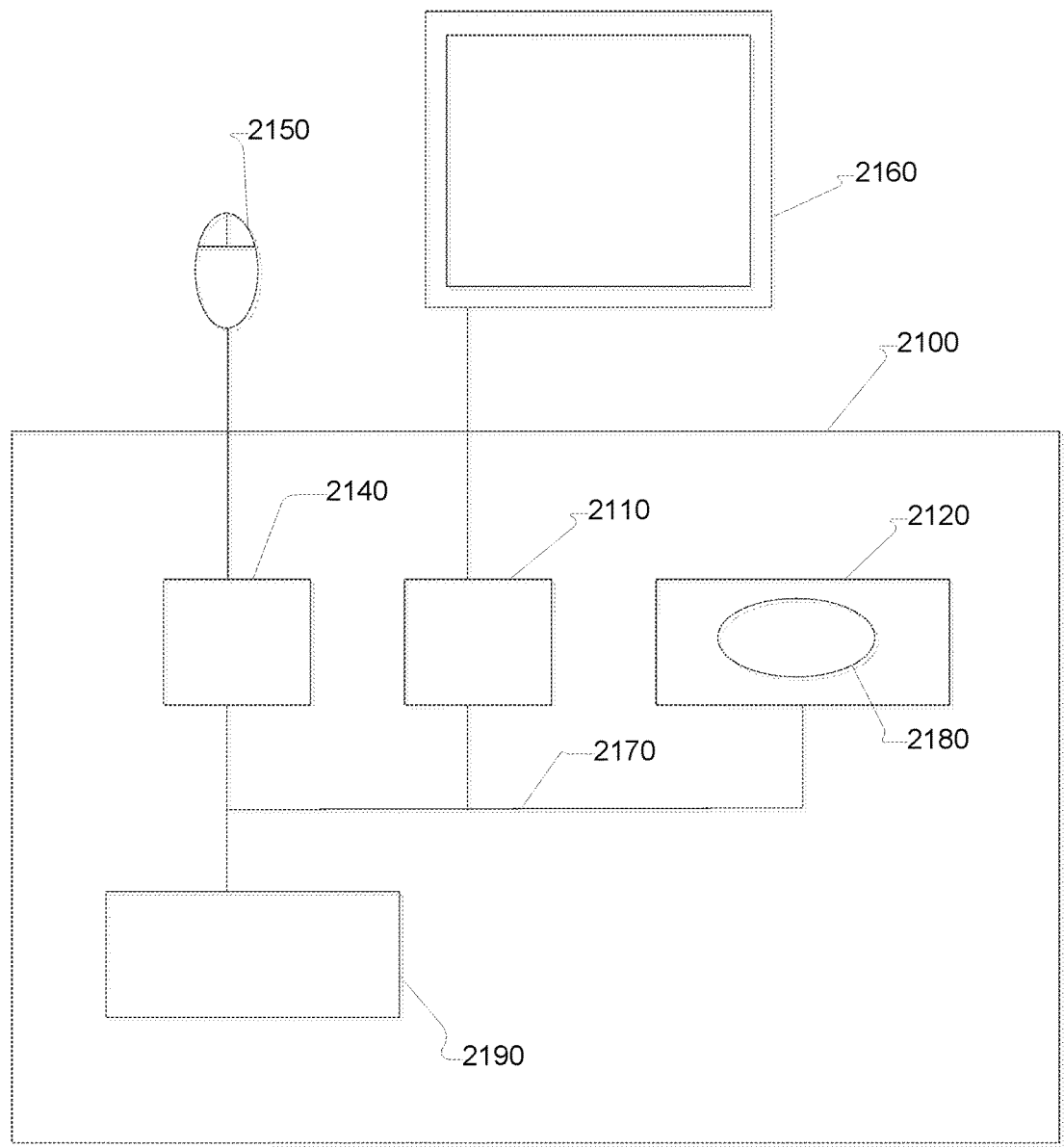
FIG. 21 illustrates an exemplary computing environment that can be used to carry out the method for extracting a subset of data from a database according to an exemplary embodiment.

One or more of the above-described techniques can be implemented in or involve one or more computer systems. FIG. 21 illustrates a generalized example of a computing environment 2100. The computing environment 2100 is not intended to suggest any limitation as to scope of use or functionality of a described embodiment.

With reference to FIG. 21, the computing environment 2100 includes at least one processing unit 2110 and memory 2120. The processing unit 2110 executes computer-executable instructions and may be a real or a virtual processor. In a multi-processing system, multiple processing units execute computer-executable instructions to increase processing power. The memory 2120 may be volatile memory (e.g., registers, cache, RAM), non-volatile memory (e.g., ROM, EEPROM, flash memory, etc.), or some combination of the two. The memory 2120 may store software instructions 2180 for implementing the described techniques when executed by one or more processors. Memory 2120 can be one memory device or multiple memory devices.

A computing environment may have additional features. For example, the computing environment 2100 includes storage 2140, one or more input devices 2150, one or more output devices 2160, and one or more communication connections 2190. An interconnection mechanism 2170, such as a bus, controller, or network interconnects the components of the computing environment 2100. Typically, operating system software or firmware (not shown) provides an operating environment for other software executing in the computing environment 2100, and coordinates activities of the components of the computing environment 2100.

The storage 2140 may be removable or non-removable, and includes magnetic disks, magnetic tapes or cassettes, CD-ROMs, CD-RWs, DVDs, or any other medium which can be used to store information and which can be accessed within the computing environment 2100. The storage 2140 may store instructions for the software 2180.

The input device(s) 2150 may be a touch input device such as a keyboard, mouse, pen, trackball, touch screen, or game controller, a voice input device, a scanning device, a digital camera, remote control, or another device that provides input to the computing environment 2100. The output device(s) 2160 may be a display, television, monitor, printer, speaker, or another device that provides output from the computing environment 2100.

The communication connection(s) 2190 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 2100, computer-readable media include memory 2120, storage 2140, communication media, and combinations of any of the above.

Of course, FIG. 21 illustrates computing environment 2100, display device 2160, and input device 2150 as separate devices for ease of identification only. Computing environment 2100, display device 2160, and input device 2150 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 2100 may be a set-top box, personal computer, or one or more servers, for example a farm of networked servers, a clustered server environment, or a cloud network of computing devices.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices for extracting a subset of data from a database, the method comprising:
   receiving, by at least one of the one or more computing devices, a request comprising at least one criterion indicating a criterion table in a plurality of tables of the database, wherein a schema of the database corresponds to an entity graph, the entity graph comprising a plurality of entities corresponding to the plurality of tables and a plurality of directed edges connecting the plurality of entities;
   determining, by at least one of the one or more computing devices, one or more directed edges in the plurality of directed edges that must be traversed in both directions in order to traverse all entities in the entity graph starting from a criterion entity corresponding to the criterion table;
   generating, by at least one of the one or more computing devices, an ordered list of edges for the entity graph based at least in part on the one or more directed edges that must be traversed in both directions and a topological ordering of one or more entities in the entity graph; and
   generating, by at least one of the one or more computing devices, the subset of data from the plurality of tables based at least in part on the ordered list of edges for the entity graph and the request.

2. The method of claim 1, further comprising:
   determining, by at least one of the one or more computing devices, whether the entity graph includes one or more cycles, wherein a cycle comprises a cyclical sequence of entities in the plurality of entities which are connected by a cyclical sequence of one or more directed edges in the plurality of directed edges; and
   condensing, by at least one of the one or more computing devices, the entity graph to remove the one or more cycles based at least in part on a determination that the entity graph includes one or more cycles.

3. The method of claim 2, wherein condensing the entity graph to remove the cycle comprises, for each cycle in the one or more cycles:
   combining all entities in the cyclical sequence of entities to generate a combined entity corresponding to the cycle; and
   for each entity in the cyclical sequence of entities, adding any directed edge connecting that entity to an entity outside the cyclical sequence of entities as a directed edge connecting the combined entity to the entity outside the cyclical sequence of entities, unless the directed edge connecting the combined entity to the entity outside the cyclical sequence of entities already exists.

4. The method of claim 1, wherein each directed edge in the plurality of directed edges runs from a child entity corresponding to a table in the plurality of tables to a parent entity corresponding to a table in the plurality of tables.

5. The method of claim 1, wherein the one or more directed edges correspond to a minimum quantity of directed edges that must be traversed in both directions in order to traverse all entities in the entity graph starting from the criterion entity.

6. The method of claim 1, wherein determining one or more directed edges in the plurality of directed edges that must be traversed in both directions in order to traverse all entities in the entity graph starting from the criterion entity comprises:
   generating an expanded entity graph by adding a plurality of opposite directed edges to the entity graph, wherein the plurality of opposite directed edges correspond to the plurality of directed edges and wherein each opposite directed edge in the plurality of opposite directed edges runs in a direction opposite to that of a corresponding directed edge in the plurality of directed edges;
   assigning a first weight to each directed edge in the plurality of directed edges in the expanded entity graph and a second weight to each opposite directed edge in the plurality of opposite directed edges in the expanded entity graph;
   determining a minimum spanning arborescence for the expanded entity graph starting at the criterion entity;
   identifying one or more opposite directed edges in the plurality of opposite directed edges which are part of the minimum spanning arborescence; and
   designating, in the entity graph, one or more directed edges which correspond to the identified one or more opposite directed edges in the expanded entity graph as edges that must be traversed in both directions in order to traverse all entities in the entity graph starting from the criterion entity.

7. The method of claim 6, wherein the second weight is greater than a combined weight assigned to all directed edges in the plurality of directed edges.

8. The method of claim 1, wherein generating an ordered list of edges for the entity graph based at least in part on the one or more directed edges that must be traversed in both directions and a topological ordering of one or more entities in the entity graph comprises:
   adding the criterion entity to a list of discovered entities;
   starting from the criterion entity, traversing the entity graph over one or more iterations and adding traversed edges to the ordered list of edges for the entity graph until the one or more directed edges that must be traversed in both directions have been traversed in a parent to child direction, wherein each iteration in the one or more iterations comprises:
   a first phase traversing, in a parent to child direction, at least one directed edge in the one or more directed edges that must be traversed in both directions, wherein the at least one directed edge has not already been traversed in a parent to child direction and wherein the at least one directed edge has a parent entity in the list of discovered entities; and
   a second phase traversing, in a child to parent direction, any directed edges connected to any entities in the list of discovered entities, wherein the second phases adds directed edges to the to the ordered list of edges for the entity graph based at least in part on a topological ordering of the entities in the list of discovered entities.

9. The method of claim 8, wherein the first phase comprises:
   iteratively traversing, in a parent to child direction, any directed edges in the one or more directed edges that must be traversed in both directions which have not already been traversed in a parent to child direction and which have a parent entity in the list of discovered entities, wherein the list of discovered entities is updated after each traversed edge to add each child entity of the traversed edge to the list of discovered entities; and adding the traversed directed edges to the ordered list of edges in the order of traversal.

10. The method of claim 8, wherein the second phase comprises:

iteratively traversing, in a child to parent direction, any directed edges which have a child entity in the list of discovered entities, wherein the list of discovered entities is updated after each traversed edge to add each parent entity of the traversed edge to the list of discovered entities; and adding any traversed directed edges which are not already in the ordered list of edges to the ordered list of edges based at least in part on a topological ordering of the entities in the list of discovered entities.

11. The method of claim 10, wherein adding any traversed directed edges which are not already in the ordered list of edges to the ordered list of edges based at least in part on a topological ordering of the entities in the list of discovered entities comprises:

adding any traversed directed edges which have a child entity with a lower topological sort position in the list of discovered entities prior to adding any traversed directed edges which have a child entity with a higher topological sort position.

12. The method of claim 10, wherein the second phase further comprises:

determining whether an entity in the list of discovered entities is a combined entity corresponding to a cyclical sequence of entities in the plurality of entities which are connected by a cyclical sequence of one or more directed edges in the plurality of directed edges; and adding the cyclical sequence of one or more directed edges to the ordered list of edges for the entity graph along with a loop indicator based at least in part on a topological ordering of the entities in the list of discovered entities.

13. The method of claim 1, wherein generating the subset of data from the plurality of tables based at least in part on the ordered list of edges for the entity graph and the request comprises:

executing a database command corresponding to the request on the database to mark one or more records in the criterion table for selection in the subset of data;

generating a list of database commands corresponding to the ordered list of edges, wherein each database command in the list of database commands corresponds to an edge in the ordered list of edges and wherein each database command references two tables in the plurality of tables corresponding to two entities specified by each edge; and executing the list of database commands on the database to mark one or more additional records in the remaining tables of the plurality of tables for selection in the subset of data.

14. An apparatus for extracting a subset of data from a database, the apparatus comprising:

one or more processors; and one or more memories operatively coupled to at least one of the one or more processors and having instructions stored thereon that, when executed by at least one of the one or more processors, cause at least one of the one or more processors to:

receive a request comprising at least one criterion indicating a criterion table in a plurality of tables of the database, wherein a schema of the database corresponds to an entity graph, the entity graph comprising a plurality of entities corresponding to the plurality of tables and a plurality of directed edges connecting the plurality of entities;

determine one or more directed edges in the plurality of directed edges that must be traversed in both directions in order to traverse all entities in the entity graph starting from a criterion entity corresponding to the criterion table;

generate an ordered list of edges for the entity graph based at least in part on the one or more directed edges that must be traversed in both directions and a topological ordering of one or more entities in the entity graph; and generate the subset of data from the plurality of tables based at least in part on the ordered list of edges for the entity graph and the request.

15. The apparatus of claim 14, wherein at least one of the one or more memories has further instructions stored thereon that, when executed by at least one of the one or more processors, cause at least one of the one or more processors to:

determine whether the entity graph includes one or more cycles, wherein a cycle comprises a cyclical sequence of entities in the plurality of entities which are connected by a cyclical sequence of one or more directed edges in the plurality of directed edges; and condense the entity graph to remove the one or more cycles based at least in part on a determination that the entity graph includes one or more cycles.

16. The apparatus of claim 15, wherein the instructions that, when executed by at least one of the one or more processors, cause at least one of the one or more processors to condense the entity graph to remove the cycle further cause at least one of the one or more processors to:

combine all entities in the cyclical sequence of entities to generate a combined entity corresponding to the cycle; and for each entity in the cyclical sequence of entities, add any directed edge connecting that entity to an entity outside the cyclical sequence of entities as a directed edge connecting the combined entity to the entity outside the cyclical sequence of entities, unless the directed edge connecting the combined entity to the entity outside the cyclical sequence of entities already exists.

17. The apparatus of claim 14, wherein each directed edge in the plurality of directed edges runs from a child entity corresponding to a table in the plurality of tables to a parent entity corresponding to a table in the plurality of tables.

18. The apparatus of claim 14, wherein the one or more directed edges correspond to a minimum quantity of directed edges that must be traversed in both directions in order to traverse all entities in the entity graph starting from the criterion entity.

19. The apparatus of claim 14, wherein the instructions that, when executed by at least one of the one or more processors, cause at least one of the one or more processors to determine one or more directed edges in the plurality of directed edges that must be traversed in both directions in order to traverse all entities in the entity graph starting from the criterion entity further cause at least one of the one or more processors to:

generate an expanded entity graph by adding a plurality of opposite directed edges to the entity graph, wherein the plurality of opposite directed edges correspond to the plurality of directed edges and wherein each opposite directed edge in the plurality of opposite directed edges runs in a direction opposite to that of a corresponding directed edge in the plurality of directed edges;

assign a first weight to each directed edge in the plurality of directed edges in the expanded entity graph and a second weight to each opposite directed edge in the plurality of opposite directed edges in the expanded entity graph;

determine a minimum spanning arborescence for the expanded entity graph starting at the criterion entity;

identify one or more opposite directed edges in the plurality of opposite directed edges which are part of the minimum spanning arborescence; and designate, in the entity graph, one or more directed edges which correspond to the identified one or more opposite directed edges in the expanded entity graph as edges that must be traversed in both directions in order to traverse all entities in the entity graph starting from the criterion entity.

20. The apparatus of claim 19, wherein the second weight is greater than a combined weight assigned to all directed edges in the plurality of directed edges.

21. The apparatus of claim 14, wherein the instructions that, when executed by at least one of the one or more processors, cause at least one of the one or more processors to generate an ordered list of edges for the entity graph based at least in part on the one or more directed edges that must be traversed in both directions and a topological ordering of one or more entities in the entity graph further cause at least one of the one or more processors to:

add the criterion entity to a list of discovered entities;

starting from the criterion entity, traverse the entity graph over one or more iterations and adding traversed edges to the ordered list of edges for the entity graph until the one or more directed edges that must be traversed in both directions have been traversed in a parent to child direction, wherein each iteration in the one or more iterations comprises:

a first phase traversing, in a parent to child direction, at least one directed edge in the one or more directed edges that must be traversed in both directions, wherein the at least one directed edge has not already been traversed in a parent to child direction and wherein the at least one directed edge has a parent entity in the list of discovered entities; and a second phase traversing, in a child to parent direction, any directed edges connected to any entities in the list of discovered entities, wherein the second phases adds directed edges to the to the ordered list of edges for the entity graph based at least in part on a topological ordering of the entities in the list of discovered entities.

22. The apparatus of claim 21, wherein the first phase comprises:

iteratively traversing, in a parent to child direction, any directed edges in the one or more directed edges that must be traversed in both directions which have not already been traversed in a parent to child direction and which have a parent entity in the list of discovered entities, wherein the list of discovered entities is updated after each traversed edge to add each child entity of the traversed edge to the list of discovered entities; and adding the traversed directed edges to the ordered list of edges in the order of traversal.

23. The apparatus of claim 21, wherein the second phase comprises:

iteratively traversing, in a child to parent direction, any directed edges which have a child entity in the list of discovered entities, wherein the list of discovered entities is updated after each traversed edge to add each parent entity of the traversed edge to the list of discovered entities; and adding any traversed directed edges which are not already in the ordered list of edges to the ordered list of edges based at least in part on a topological ordering of the entities in the list of discovered entities.

24. The apparatus of claim 23, wherein the instructions that, when executed by at least one of the one or more processors, cause at least one of the one or more processors to add any traversed directed edges which are not already in the ordered list of edges to the ordered list of edges based at least in part on a topological ordering of the entities in the list of discovered entities further cause at least one of the one or more processors to:

add any traversed directed edges which have a child entity with a lower topological sort position in the list of discovered entities prior to adding any traversed directed edges which have a child entity with a higher topological sort position.

25. The apparatus of claim 23, wherein the second phase further comprises:

determining whether an entity in the list of discovered entities is a combined entity corresponding to a cyclical sequence of entities in the plurality of entities which are connected by a cyclical sequence of one or more directed edges in the plurality of directed edges; and adding the cyclical sequence of one or more directed edges to the ordered list of edges for the entity graph along with a loop indicator based at least in part on a topological ordering of the entities in the list of discovered entities.

26. The apparatus of claim 14, wherein the instructions that, when executed by at least one of the one or more processors, cause at least one of the one or more processors to generate the subset of data from the plurality of tables based at least in part on the ordered list of edges for the entity graph and the request further cause at least one of the one or more processors to:

execute a database command corresponding to the request on the database to mark one or more records in the criterion table for selection in the subset of data;

generate a list of database commands corresponding to the ordered list of edges, wherein each database command in the list of database commands corresponds to an edge in the ordered list of edges and wherein each database command references two tables in the plurality of tables corresponding to two entities specified by each edge; and execute the list of database commands on the database to mark one or more additional records in the remaining tables of the plurality of tables for selection in the subset of data.

27. At least one non-transitory computer-readable medium storing computer-readable instructions that, when executed by one or more computing devices, cause at least one of the one or more computing devices to:

receive a request comprising at least one criterion indicating a criterion table in a plurality of tables of the database, wherein a schema of the database corresponds to an entity graph, the entity graph comprising a plurality of entities corresponding to the plurality of tables and a plurality of directed edges connecting the plurality of entities;

determine one or more directed edges in the plurality of directed edges that must be traversed in both directions in order to traverse all entities in the entity graph starting from a criterion entity corresponding to the criterion table;

generate an ordered list of edges for the entity graph based at least in part on the one or more directed edges that must be traversed in both directions and a topological ordering of one or more entities in the entity graph; and generate the subset of data from the plurality of tables based at least in part on the ordered list of edges for the entity graph and the request.

28. The at least one non-transitory computer-readable medium of claim 27, further storing computer-readable instructions that, when executed by at least one of the one or more computing devices, cause at least one of the one or more computing devices to:

determine whether the entity graph includes one or more cycles, wherein a cycle comprises a cyclical sequence of entities in the plurality of entities which are connected by a cyclical sequence of one or more directed edges in the plurality of directed edges; and condense the entity graph to remove the one or more cycles based at least in part on a determination that the entity graph includes one or more cycles.

29. The at least one non-transitory computer-readable medium of claim 28, wherein the instructions that, when executed by at least one of the one or more computing devices, cause at least one of the one or more computing devices to condense the entity graph to remove the cycle further cause at least one of the one or more computing devices to:

combine all entities in the cyclical sequence of entities to generate a combined entity corresponding to the cycle; and for each entity in the cyclical sequence of entities, add any directed edge connecting that entity to an entity outside the cyclical sequence of entities as a directed edge connecting the combined entity to the entity outside the cyclical sequence of entities, unless the directed edge connecting the combined entity to the entity outside the cyclical sequence of entities already exists.

30. The at least one non-transitory computer-readable medium of claim 27, wherein each directed edge in the plurality of directed edges runs from a child entity corresponding to a table in the plurality of tables to a parent entity corresponding to a table in the plurality of tables.

31. The at least one non-transitory computer-readable medium of claim 27, wherein the one or more directed edges correspond to a minimum quantity of directed edges that must be traversed in both directions in order to traverse all entities in the entity graph starting from the criterion entity.

32. The at least one non-transitory computer-readable medium of claim 27, wherein the instructions that, when executed by at least one of the one or more computing devices, cause at least one of the one or more computing devices to determine one or more directed edges in the plurality of directed edges that must be traversed in both directions in order to traverse all entities in the entity graph starting from the criterion entity further cause at least one of the one or more computing devices to:

generate an expanded entity graph by adding a plurality of opposite directed edges to the entity graph, wherein the plurality of opposite directed edges correspond to the plurality of directed edges and wherein each opposite directed edge in the plurality of opposite directed edges runs in a direction opposite to that of a corresponding directed edge in the plurality of directed edges;

assign a first weight to each directed edge in the plurality of directed edges in the expanded entity graph and a second weight to each opposite directed edge in the plurality of opposite directed edges in the expanded entity graph;

determine a minimum spanning arborescence for the expanded entity graph starting at the criterion entity;

identify one or more opposite directed edges in the plurality of opposite directed edges which are part of the minimum spanning arborescence; and designate, in the entity graph, one or more directed edges which correspond to the identified one or more opposite directed edges in the expanded entity graph as edges that must be traversed in both directions in order to traverse all entities in the entity graph starting from the criterion entity.

33. The at least one non-transitory computer-readable medium of claim 32, wherein the second weight is greater than a combined weight assigned to all directed edges in the plurality of directed edges.

34. The at least one non-transitory computer-readable medium of claim 27, wherein the instructions that, when executed by at least one of the one or more computing devices, cause at least one of the one or more computing devices to generating an ordered list of edges for the entity graph based at least in part on the one or more directed edges that must be traversed in both directions and a topological ordering of one or more entities in the entity graph further cause at least one of the one or more computing devices to:

add the criterion entity to a list of discovered entities;

starting from the criterion entity, traverse the entity graph over one or more iterations and adding traversed edges to the ordered list of edges for the entity graph until the one or more directed edges that must be traversed in both directions have been traversed in a parent to child direction, wherein each iteration in the one or more iterations comprises:

a first phase traversing, in a parent to child direction, at least one directed edge in the one or more directed edges that must be traversed in both directions, wherein the at least one directed edge has not already been traversed in a parent to child direction and wherein the at least one directed edge has a parent entity in the list of discovered entities; and a second phase traversing, in a child to parent direction, any directed edges connected to any entities in the list of discovered entities, wherein the second phases adds directed edges to the to the ordered list of edges for the entity graph based at least in part on a topological ordering of the entities in the list of discovered entities.

35. The at least one non-transitory computer-readable medium of claim 34, wherein the first phase comprises:

iteratively traversing, in a parent to child direction, any directed edges in the one or more directed edges that must be traversed in both directions which have not already been traversed in a parent to child direction and which have a parent entity in the list of discovered entities, wherein the list of discovered entities is updated after each traversed edge to add each child entity of the traversed edge to the list of discovered entities; and adding the traversed directed edges to the ordered list of edges in the order of traversal.

36. The at least one non-transitory computer-readable medium of claim 34, wherein the second phase comprises:
iteratively traversing, in a child to parent direction, any directed edges which have a child entity in the list of discovered entities, wherein the list of discovered entities is updated after each traversed edge to add each parent entity of the traversed edge to the list of discovered entities; and
adding any traversed directed edges which are not already in the ordered list of edges to the ordered list of edges based at least in part on a topological ordering of the entities in the list of discovered entities.

37. The at least one non-transitory computer-readable medium of claim 36, wherein the instructions that, when executed by at least one of the one or more computing devices, cause at least one of the one or more computing devices to add any traversed directed edges which are not already in the ordered list of edges to the ordered list of edges based at least in part on a topological ordering of the entities in the list of discovered entities further cause at least one of the one or more computing devices to:
add any traversed directed edges which have a child entity with a lower topological sort position in the list of discovered entities prior to adding any traversed directed edges which have a child entity with a higher topological sort position.

38. The at least one non-transitory computer-readable medium of claim 36, wherein the second phase further comprises:
determining whether an entity in the list of discovered entities is a combined entity corresponding to a cyclical sequence of entities in the plurality of entities which are connected by a cyclical sequence of one or more directed edges in the plurality of directed edges; and
adding the cyclical sequence of one or more directed edges to the ordered list of edges for the entity graph along with a loop indicator based at least in part on a topological ordering of the entities in the list of discovered entities.

39. The at least one non-transitory computer-readable medium of claim 27, wherein the instructions that, when executed by at least one of the one or more computing devices, cause at least one of the one or more computing devices to generate the subset of data from the plurality of tables based at least in part on the ordered list of edges for the entity graph and the request further cause at least one of the one or more computing devices to:
execute a database command corresponding to the request on the database to mark one or more records in the criterion table for selection in the subset of data;
generate a list of database commands corresponding to the ordered list of edges, wherein each database command in the list of database commands corresponds to an edge in the ordered list of edges and wherein each database command references two tables in the plurality of tables corresponding to two entities specified by each edge; and
execute the list of database commands on the database to mark one or more additional records in the remaining tables of the plurality of tables for selection in the subset of data.

* * * * *